United States Patent
Hayata et al.

(10) Patent No.: US 7,224,823 B2
(45) Date of Patent: May 29, 2007

(54) PARAMETER ESTIMATION APPARATUS AND DATA MATCHING APPARATUS

(75) Inventors: Keisuke Hayata, Kunitachi (JP); Kenji Nagao, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 819 days.

(21) Appl. No.: 10/415,884

(22) PCT Filed: Sep. 25, 2002

(86) PCT No.: PCT/JP02/09885

§ 371 (c)(1),
(2), (4) Date: May 8, 2003

(87) PCT Pub. No.: WO03/027956

PCT Pub. Date: Apr. 3, 2003

(65) Prior Publication Data

US 2004/0022432 A1 Feb. 5, 2004

(30) Foreign Application Priority Data

Sep. 25, 2001 (JP) ............................. 2001-291620
Apr. 30, 2002 (JP) ............................. 2002-129428

(51) Int. Cl.
G06K 9/00 (2006.01)
G06K 9/62 (2006.01)

(52) U.S. Cl. .................... 382/118; 382/159; 382/170; 382/181; 382/224

(58) Field of Classification Search .............. 382/115, 382/117, 118, 159, 160, 165, 170, 181, 224, 382/225, 227, 228; 700/47–52; 706/15, 706/17, 20

See application file for complete search history.

(56) References Cited

U.S. PATENT DOCUMENTS 2,978,675 A * 4/1961 Highleyman ................ 382/228
5,016,282 A    5/1991 Tomono et al.
5,283,839 A * 2/1994 Edelman et al. ............ 382/103

(Continued)

FOREIGN PATENT DOCUMENTS

EP    0350957    1/1990

(Continued)

OTHER PUBLICATIONS

Nagao, K.; "Face Recognition by distribution specific feature extraction"; I.E.E.E. Computer Vision and Pattern Recognition, Jun. 2000, pp. 278-285 vol. 1.*

(Continued)

*Primary Examiner*—Matthew C. Bella
*Assistant Examiner*—Brian Le
(74) *Attorney, Agent, or Firm*—Greenblum & Bernstein, P.L.C.

(57) ABSTRACT

The present invention enables estimation of desired parameters with less computation cost and with high precision by inputting first training vectors generated from observation patterns and second training vectors generated from estimation targets in order to learn the correlation between observation patterns as inputs and patterns of the estimation targets such that desired outputs are assumed from the inputs, calculating the auto-correlation information of the two training vectors, and cross-correlation information of an average vector, the first training vectors and second training vectors, and using the information, obtaining probable expectation values based on the Bayes theory of the estimation targets with respect to an input pattern.

30 Claims, 28 Drawing Sheets

U.S. PATENT DOCUMENTS

| | | | |
|---|---|---|---|
| 5,754,693 A * | 5/1998 | Takesue et al. | 382/224 |
| 6,044,168 A | 3/2000 | Tuceryan et al. | |
| 6,178,261 B1 | 1/2001 | Williams et al. | |
| 6,301,387 B1 * | 10/2001 | Sun et al. | 382/217 |
| 6,628,811 B1 | 9/2003 | Nagao et al. | |
| 6,888,955 B2 * | 5/2005 | Masumoto et al. | 382/118 |
| 2001/0028731 A1 * | 10/2001 | Covell et al. | 382/118 |
| 2002/0012454 A1 * | 1/2002 | Liu et al. | 382/118 |
| 2003/0016846 A1 * | 1/2003 | Chen et al. | 382/117 |
| 2003/0026484 A1 * | 2/2003 | O'Neill | 382/224 |

FOREIGN PATENT DOCUMENTS

| | | |
|---|---|---|
| EP | 0944018 | 9/1999 |
| JP | 05303643 | 11/1993 |
| JP | 08063597 | 3/1996 |
| JP | 10228544 | 8/1998 |
| JP | 2001-118068 | 1/2001 |
| JP | 2001014465 | 1/2001 |

OTHER PUBLICATIONS

Brunelli, R. et al.; "Face Recognition: features versus templates", I.E.E.E. Pattern Analysis and Machine Intelligenece; Oct. 1999 pp. 1041-1052 vol. 15 Issue 10.*

Nagao, K. et al.; "Direct Object Recognition Using No Higher Than Second Order Statistics of the Image"; Aug. 1995 pp. 360-367 vol. 2.*

English Language Abstract of JP Appln. No. 10-228544.
English Language Abstract of JP Appln. No. 05-303643.
English Language Abstract of JP Appln. No. 08-063597.
English Language Abstract of JP Appln. No. 2001-014465.

Brunelli et al., "Face Recognition:Features versus Templates," IEE Transactions on Pattern Analysis and Machine Intelligence, vol. 15, No. 10, Oct. 1993, pp. 1042-1052.

Bishop, "Neural Networks for Pattern Recognition," Oxford, 1995, pp. 58-73.

* cited by examiner

PARAMETER ESTIMATION APPARATUS AND DATA MATCHING APPARATUS

TECHNICAL FIELD

The present invention relates to a parameter estimation apparatus that extracts specific parameters from an input pattern and a data matching apparatus using the parameter estimation apparatus.

BACKGROUND ART

The processing for extracting specific parameters from an input pattern is indeed general processing in pattern information processing, and for example, includes processing for extracting positions of eyes and ears from an image of a human face and processing for extracting a position of a number plate from an image of a vehicle.

Conventionally, the most popular method of such processing is called a matched filter method as summarized below, and an extremely large number of applications have been proposed. As an example, a method of extracting facial features will be described below with reference to FIG. 1.

As illustrated in the operation flow chart in FIG. 1, templates of eye and ear regions are stored in template database 1601 in advance. As illustrated in FIG. 2, a plurality of eye templates 1701 is stored in template database 1601.

When an input image is provided from a camera (S81), a single template 1701 is obtained from template database 1601 (S82). Next, as illustrated in FIG. 3, input image 2001 is searched using search window 2002, and the similarity degree between an image within search window 2002 and template 1701 is obtained (S83). The computation of the similarity degree usually uses the normalized correlation between the image within search window 2002 and template 1701.

It is judged whether the above processing is executed on the whole input image 2001 (S84), input image 2001 is scanned using search window 2002 until the scanning is performed on the whole input image 2001 (S85), and the processing S83 is executed.

Then, it is judged whether the above search is performed with respect to all the templates 1701 contained in template database 1601 (S86). When the processing is not executed with respect to all the templates 1701, a target template 1701 is changed (S87), the processing flow shifts to S83, and the processing of S83 to S85 is executed on all the templates.

Based on similarity degrees between the image within search window 2002 and templates 1701 obtained in the processing of S83 to S87, a position of a local area (search window 2002 region) that is the most similar to template 1701 is found from input image 2001, and the position corresponding to the local area is output (S88).

An example of methods based on the aforementioned method is described in detail in R. Brunelli, T. Poggio, "Face recognition: Features Versus template", IEEE Trans. Patt. Anal. Machine Intell., vol. PAMI-8, pages 34 to 43, 1993.

A difficulty in the aforementioned conventional method is processing cost in computer. Assuming that a size of an input image in which search is performed is S, template size is T, and the normalized correlation is used as a criterion of similarity degree, when the multiplication is unit computation, a time computation amount requires the number of computations of $2 \times T \times S$. For example, in extracting coordinates of a feature point of a typical face image, under the assumption that $T=50\times20=1000$ (pel) and $S=150\times160=22500$ (pel), it is required to multiply $2\times1000\times22500=45\times1000,000=4500$ millions times. Such a large number of multiplications require enormous computation cost; even the computation speed of a computer is improved.

Templates used in the processing usually use typical data such as an average of all learning data, which causes many cases that the matching does not work well depending on environments. Therefore, there is a method of performing the similarity degree computation using a plurality of templates prepared corresponding to the input pattern. However, such a method increases the number of processing corresponding to the number of templates, and therefore, imposes loads on a computer also in term of processing cost.

DISCLOSURE OF INVENTION

It is an object of the present invention to obtain coordinates of feature points of input data with reduced cost.

In the present invention, the correlation is learned in advance between sample data and coordinates of a feature point in the data, and using the correlation obtained by the learning, coordinates of a feature point of input data are estimated.

Since there is predetermined correlation between the same kind of data and coordinates of a feature point in such data, it is possible to obtain coordinates of a feature point of the data with less processing cost and with accuracy, using the correlation obtained as described above.

BEST MODE FOR CARRYING OUT THE INVENTION

FIRST EMBODIMENT

The first embodiment of the present invention explains a case where a parameter estimation apparatus is applied to a data matching apparatus.

Figure 4:
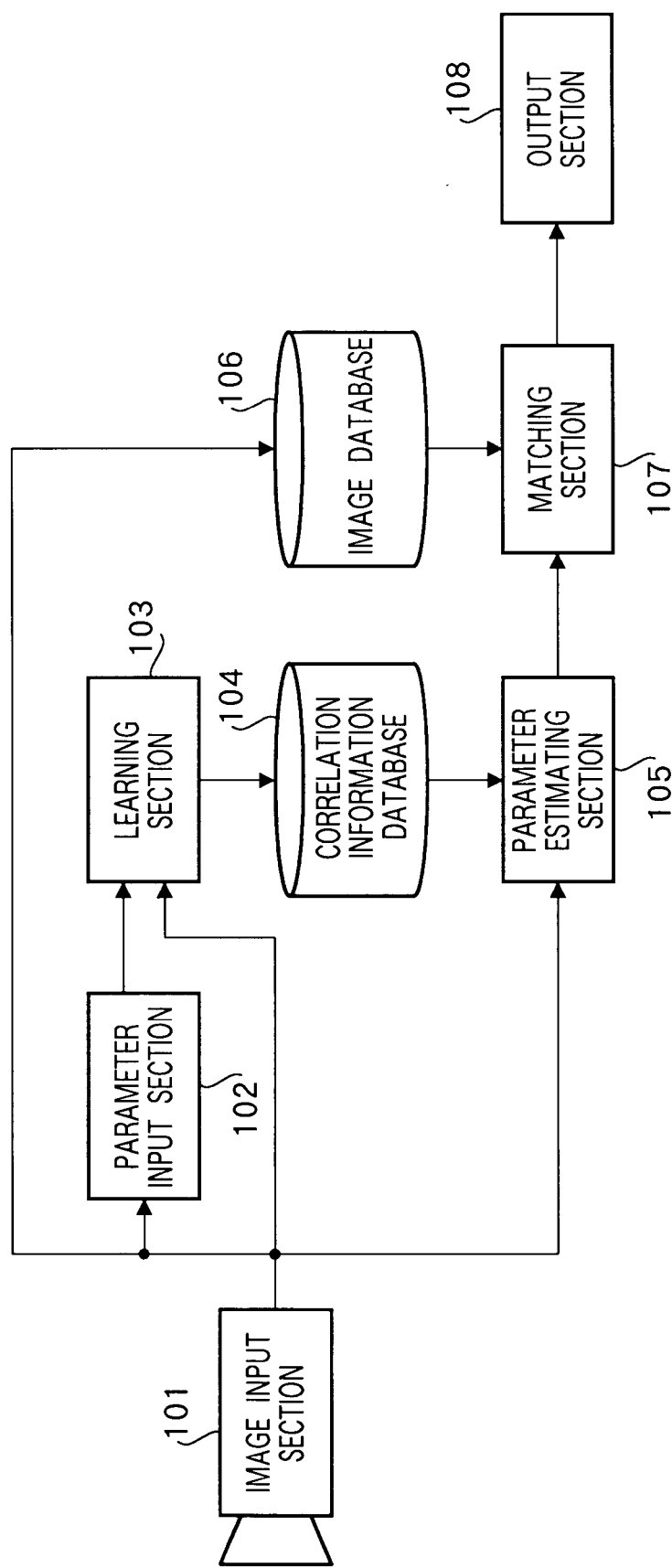
FIG. 4 is a diagram illustrating a data matching apparatus according to a first embodiment of the present invention.

FIG. 4 is a diagram illustrating a data matching apparatus according to the first embodiment of the present invention.

Image input section 101 converts optical data into electronic data to output.

Parameter input section 102 inputs coordinates of a feature point of the first electronic data input from image input section 101.

Learning section 103 calculates information on the first electronic data from the first electronic data input from image input section 101 and the coordinates of a feature point input from parameter input section 102.

Correlation information database 104 stores the information on the first electronic data calculated in learning section 103.

Parameter estimating section 105 estimates coordinates of a feature point in second electronic data from the second electronic input from image input section 101 and the information on the first electronic data stored in correlation information database 104.

Image database 106 stores the first electronic data.

Matching section 107 matches the first data with the second data to obtain the first data matching the coordinates of the feature point in the second electronic data estimated in parameter estimating section 105.

Output section 108 displays matching results matched in matching section 107.

The data matching apparatus according to the first embodiment will be described below. In the matching of an image of a face, it is important to accurately obtain positions in which the face is present from electronic data input from image input section 101.

In the first embodiment, attention is drawn to the fact that there is the correlation between an image of a face that is input electronic data and coordinates of a feature point such as eyes, nose, eyebrows and mouth that are specific parameters in the image of the face. In other words, it is noted that when the correlation of coordinates of parameters specific to face images are obtained in advance, it is possible to obtain coordinates of feature points that are specific parameters when an unknown face image is input.

That is, in the first embodiment, the correlation is learned between face images (that are) samples and coordinates of feature points of the sample face images, and using the learned correlation, coordinates is estimated of feature points in a matching-target face image that is the second electronic data shot in image input section 101. Further, using the estimated coordinates of feature points, a face region that is a region to match is obtained. Then, in the first embodiment, an image of the obtained face region is compared with each image stored beforehand in face image database 106, thus performing matching on face images.

Further, the first embodiment improves the accuracy in estimating coordinates of feature points in a matching-target face image, by learning the correlation between face images samples and coordinates of feature points in the plurality of face images.

Specifically, (the) processing in the data matching apparatus in the first embodiment is divided roughly (broadly) into offline processing and online processing.

The offline processing calculates in advance the correlation between a sample face images and coordinates of feature points of the face images.

The online processing estimates coordinates of feature points of a matching-target face image input from image input section 101 using the correlation calculated in the offline processing, and match an image of the face region determined from the coordinates of feature points with face images in image database 106 that are registered in advance by the offline processing.

The offline processing will be described below. The offline processing is performed using image input section 101, learning section 103, correlation information database 104, and image database 106.

Figure 5:
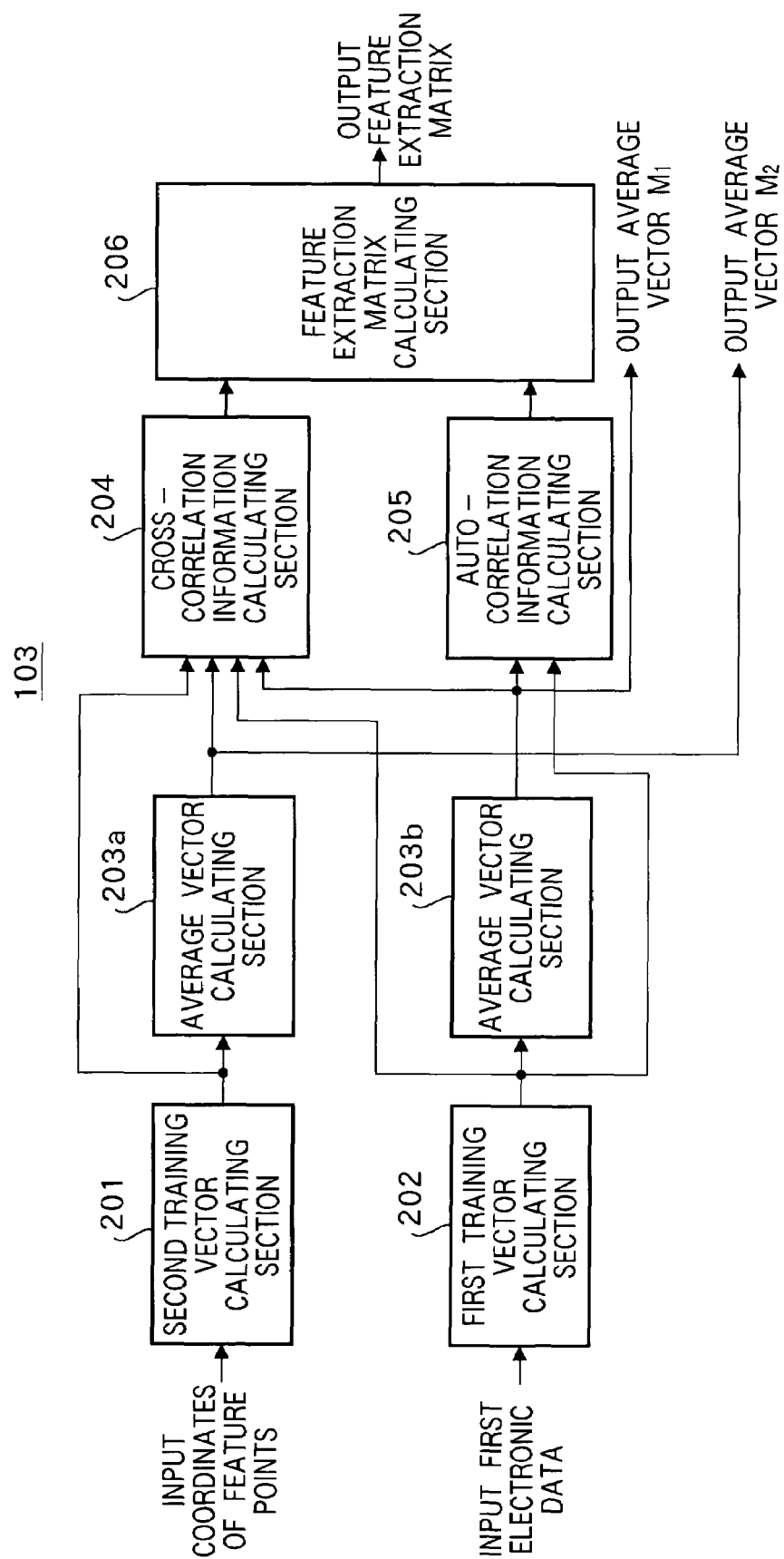
FIG. 5 is a diagram illustrating a learning section according to the first embodiment.
Figure 6:
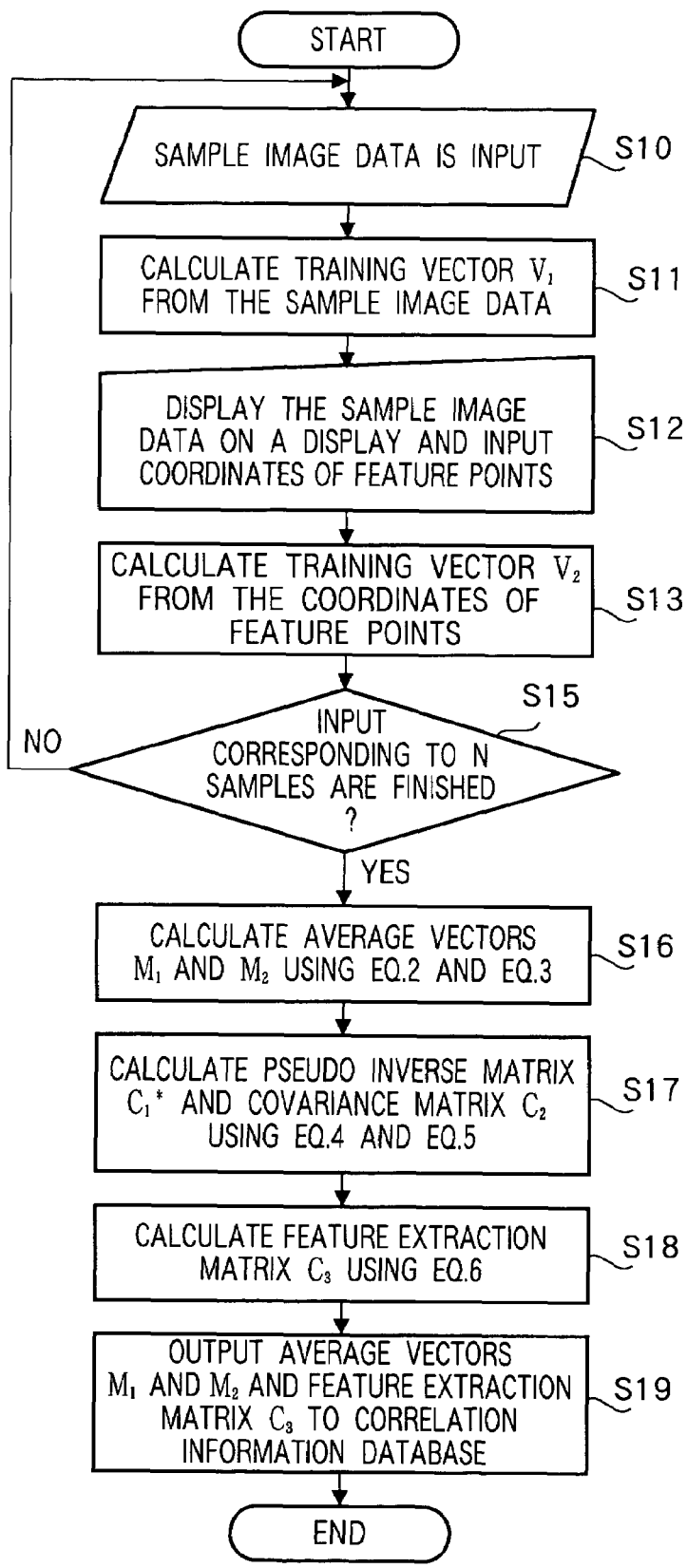
FIG. 6 is an operation flow diagram of offline processing of the data matching apparatus according to the first embodiment.

The offline processing performed in the data matching apparatus will be described specifically below with reference to FIGS. 5 and 6. FIG. 5 is a block diagram illustrating a configuration of learning section 103. FIG. 6 is an operation flow diagram of the offline processing in the data matching apparatus in the first embodiment.

A configuration of learning section 103 is explained first.

Learning section 103 is provided with second training vector calculating section 201 that calculates second training vectors obtained from coordinates of feature points in face images that are the first electronic data, and outputs the second training vectors.

Learning section 103 is further provided with first training vector calculating section 202 that calculates first training vectors obtained from face images that are the first electronic data, and outputs the first training vectors.

Average vector calculating section 203a calculates an average vector of the second training vectors calculated in second training vector calculating section 201. Average vector calculating section 203b calculates an average vector of the first training vectors calculated in first training vector calculating section 202.

Cross-correlation information calculating section 204 calculates a covariance matrix that is the cross-correlation information between the first training vectors calculated in first training vector calculating section 202 and the second training vectors calculated in second training vector calculating section 201.

Auto-correlation information calculating section 205 calculates a pseudo inverse matrix of the covariance matrix that is the auto-correlation information of the first training vectors obtained in first training vector calculating section 202.

Feature extraction matrix calculating section 206 calculates a feature extraction matrix from the pseudo inverse matrix of the covariance matrix of the auto-correlation information calculated in auto-correction information calculating section 205 and the covariance matrix of the cross-correlation information calculated in cross-correlation information calculating section 204.

Next, the operation of the offline processing in the data matching apparatus will be described with reference to FIG. 6.

Image input section 101 receives sample face images that is the first electronic data to input to parameter input section 102, learning section 103 and image database 106 (S10).

In addition, it may be possible to enter electronic data different from the first electronic data to image database 106.

First training vector calculating section 202 in learning section 103 converts respective values of pixels in an input sample face image into a vector pattern where the values are arranged in the order of raster scan to obtain training vector $V_1$ (S11) using equation 1 (S1), and outputs the vector to vector average calculating section 203b.

$$V = [V_1^T, V_2^T, \ldots, V_M^T]^T \quad \text{Eq.1}$$

[$V_1, \ldots, V_M$ are components of vector $V$ ($M \geq 1$).]

A display included in parameter input section 102 displays a sample face image. When a user selects coordinates of feature points of a face from the face image using a mouse included in parameter input section 102, parameter input section 102 outputs the coordinates of feature points of the face selected by the user to leaning section 103 (S12).

Figure 7:
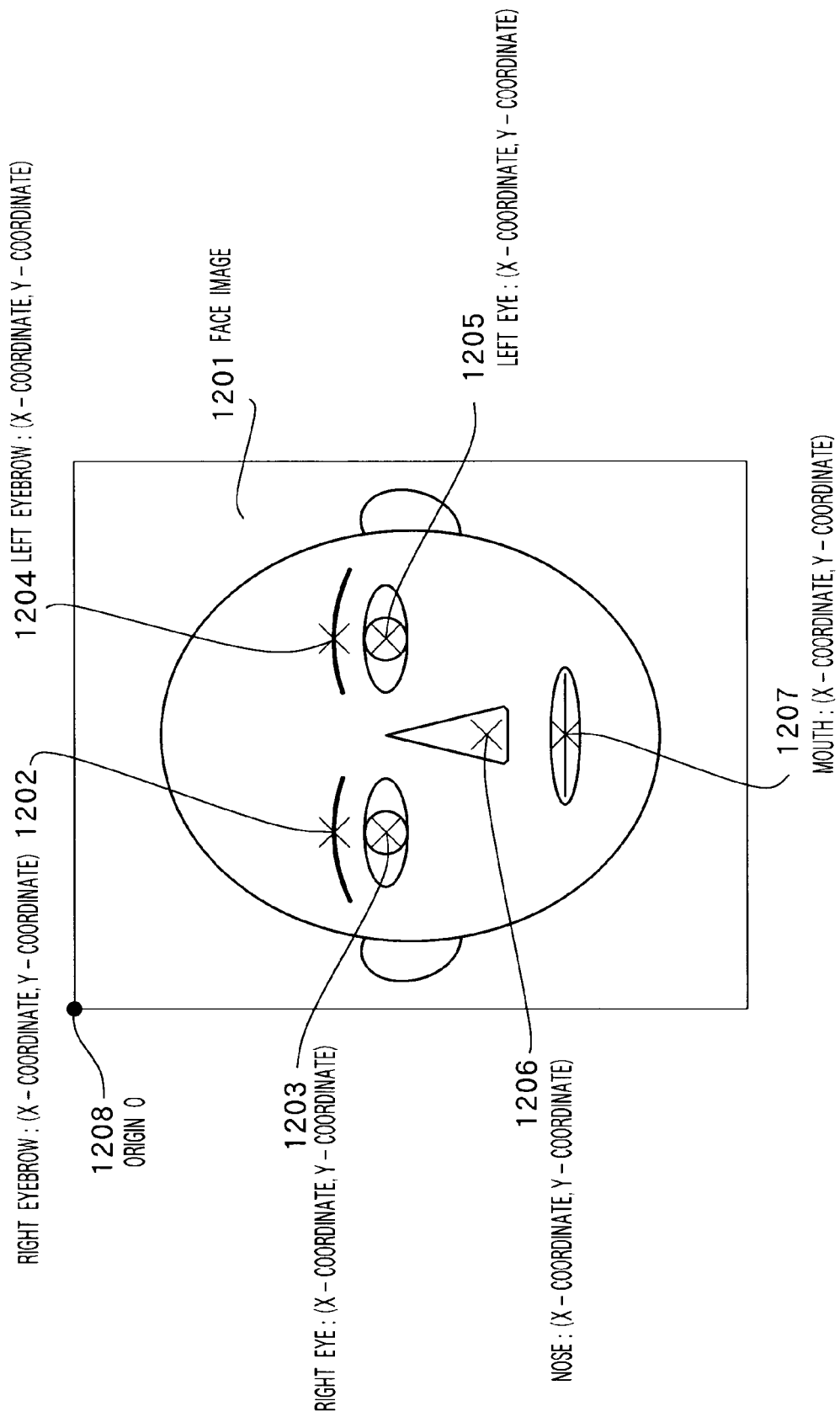
FIG. 7 is a view illustrating coordinates of feature points of a face input by a user in the first embodiment.

The input coordinates of feature points of the face are shown in FIG. 7. Using origin 1208 of face image 1201 as the base, the user selects coordinates (x-coordinate and y-coordinate) of each of right eyebrow 1202, right eye 1203, left eyebrow 1204, left eye 1205, nose 1206 and mouth 1207, as coordinates of feature points.

Using Equation 1, second vector calculating section 201 in learning section 103 arranges and combines input coordinates of feature points in the order determined for the data matching apparatus, for example, in the order of right eyebrow, right eye, left eyebrow, left eye, nose and mouth, to generate a single vector data as second training vector $V_2$ (S13), and outputs the vector to average vector calculating section 203a.

Parameter input section 102, second training vector calculating section 201 and first training vector calculating section 202 in learning section 103 perform the processing of S10 to S13 repeatedly N times corresponding to required N samples. When the processing is finished, the processing flow proceeds to S16. When the processing is not finished, processing of S11 to S14 is repeated (S15).

Average vector calculating sections 203a and 203b calculate average vector $M_1$ that is an average vector of training vectors $V_1$ and average vector $M_2$ that is an average vector of training vectors $V_2$, using {$V_1$} that is a set of N training vectors $V_1$ and {$V_2$} that is a set of N training vectors $V_2$ and Equations 2 and 3, respectively (16).

Then, average vector calculating section 203b outputs average vector $M_1$ to auto-correlation information calculating section 205 and cross-correlation information calculating section 206, and average vector calculating section 203a outputs average vector $M_2$ to cross-correlation information calculating section 204.

$$M_1 = \frac{1}{N} \sum_{i=1}^{N} V_{1i} \quad \text{Eq. 2}$$

$$M_2 = \frac{1}{N} \sum_{i=1}^{N} V_{2i} \quad \text{Eq. 3}$$

$\begin{bmatrix} M_1 \text{ and } M_2 \text{ are average vectors respectively of } \{V_1\} \text{ and } \{V_2\} \\ N \text{ is the number of samples} \\ i \text{ is an index to each one } (1 \leq i \leq N). \end{bmatrix}$ Auto-correlation information calculating section 205 substitutes {$V_1$} that is set of N training vectors $V_1$ and average vector $M_1$ into Eq.4, calculates covariance matrix $C_1$ that is the distribution of training vector $V_1$, and thus calculates the distribution of N face images input from image input section 101. Auto-correlation information calculating section 205 transforms covariance matrix $C_1$ into pseudo inverse matrix $C_1^*$ to output to feature extraction matrix calculating section 206.

$$C_1 = \frac{1}{N} \sum_{i=1}^{N} (V_{1i} - M_1)(V_{1i} - M_1)^T \quad \text{Eq. 4}$$

$\begin{bmatrix} M_1 \text{ is the average vectors of} \{V_1\} \\ N \text{ is the number of samples} \\ i \text{ is index to each one} (1 \leq i \leq N). \end{bmatrix}$ Further, cross-correlation information calculating section 204 substitutes N training vectors $V_1$, N training vectors $V_2$, average vector $M_1$, and average vector $M_2$ into Equation 5, calculates covariance matrix $C_2$ that is the correlation between training vectors $V_1$ and training vectors $V_2$, thus calculates the correlation between the N face images and coordinates of feature points in the face images to output to feature extraction matrix calculating section 206 (S17).

$$C_2 = \frac{1}{N} \sum_{i=1}^{N} (V_{2i} - M_2)(V_{1i} - M_1)^T \quad \text{Eq. 5}$$

$\begin{bmatrix} M_1 \text{ and } M_2 \text{ are average vectors respectively of} \{V_1\} \text{ and} \{V_2\} \\ N \text{ is the number of samples} \\ i \text{ is an index to each one} (1 \leq i \leq N). \end{bmatrix}$ Next, feature extraction matrix calculating section 206 calculates feature extraction matrix $C_3$ for extracting coordinates of feature points from pseudo inverse matrix $C_1^*$ and covariance matrix $C_2$ obtained in S17 and the matching-target face image input in the online processing, according to Equation 6 (S18).

$$C_3 = C_2 C_1^*  \qquad \text{Eq.6}$$

Then, feature extraction matrix calculating section 206 outputs obtained average vectors $M_1$ and $M_2$ and feature extraction matrix $C_3$ to correlation information database 104 (S19). Thus, the offline processing is finished.

Figure 8:
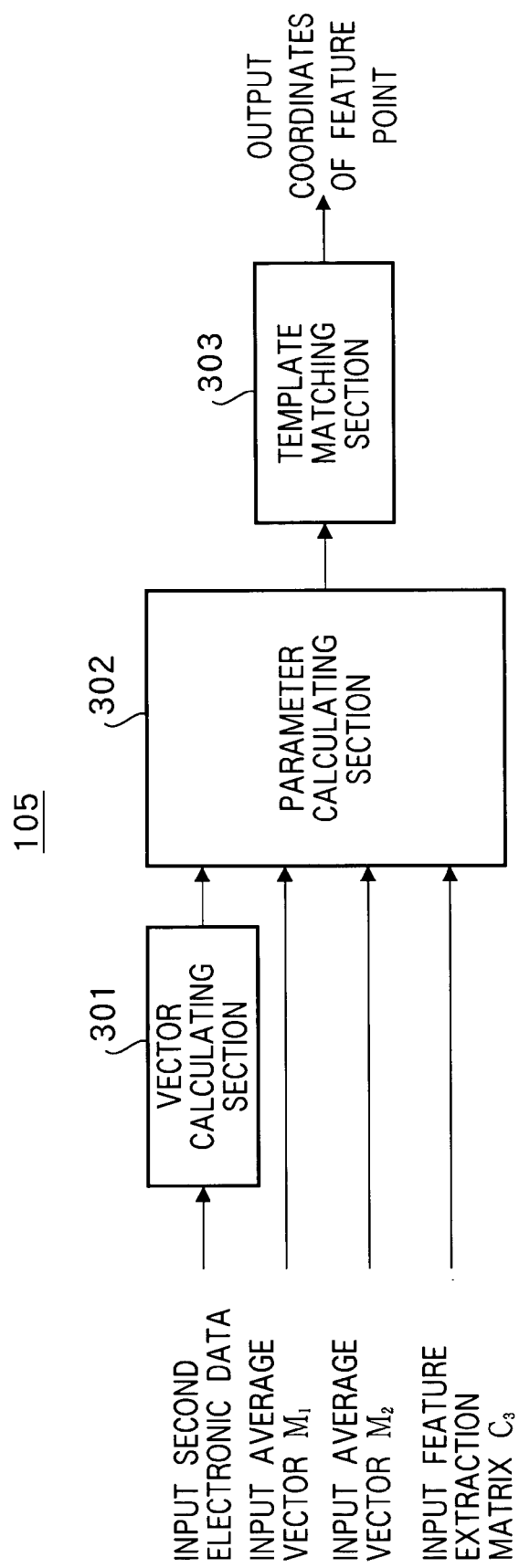
FIG. 8 is a diagram illustrating a parameter estimating section in the first embodiment.
Figure 9:
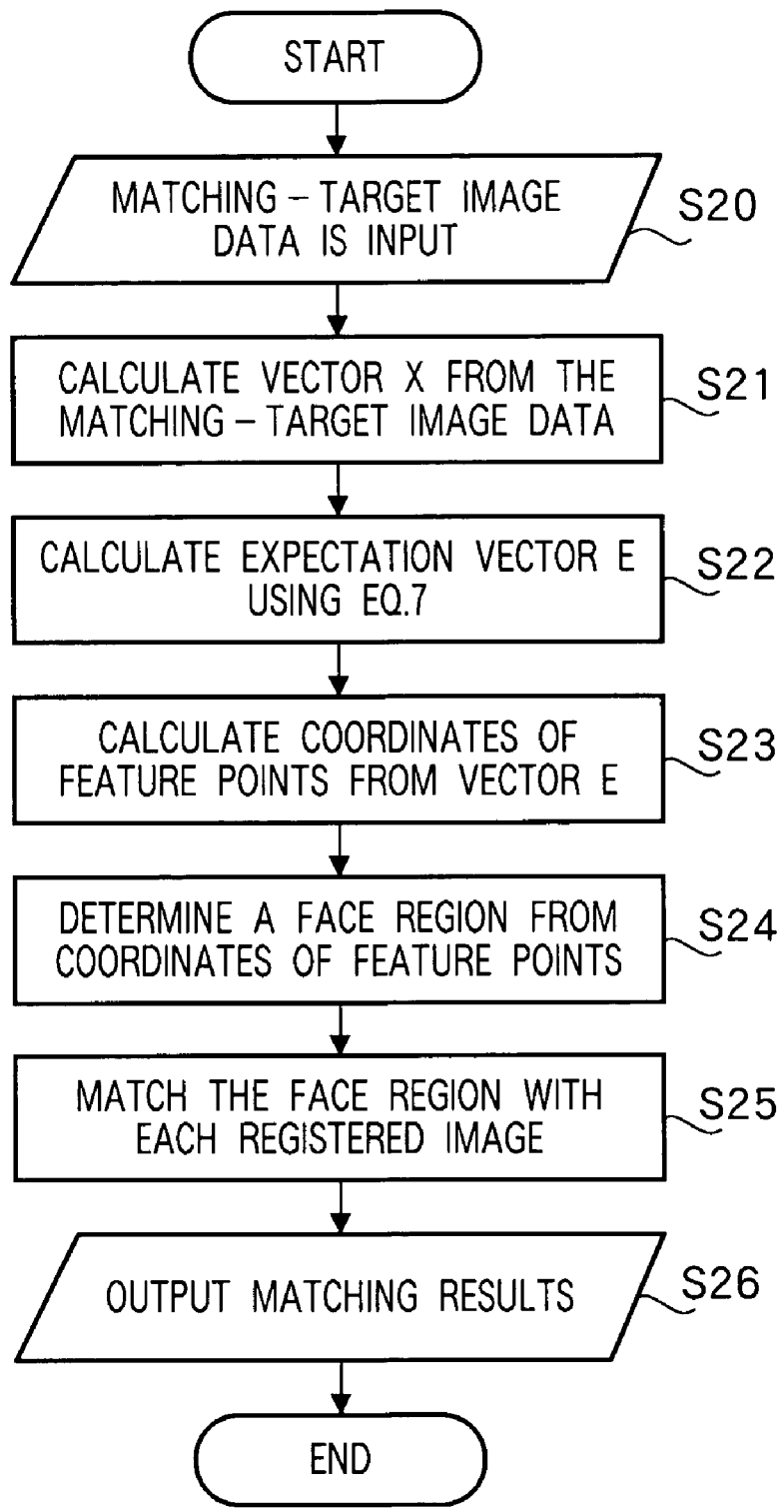
FIG. 9 is an operation flow diagram of online processing of the data matching apparatus according to the first embodiment.

The online processing will be described below with reference to FIGS. 8 and 9. FIG. 8 is a diagram illustrating a configuration of parameter estimating section 105. FIG. 9 is an operation flow diagram of the online processing of the data matching apparatus according to the first embodiment.

Parameter estimating section 105 is provided with vector calculating section 301 that calculates an input vector X from the second electronic data to output.

Parameter calculating section 302 calculates an expectation vector containing coordinates of feature points from input vector X calculated in parameter estimating section 105, average vectors $M_1$ and $M_2$ and feature extraction matrix $C_3$ to output.

Template matching section 303 calculates coordinates of feature points from the expectation vector calculated in parameter calculating section 302 to output.

A purpose of the online processing is estimating coordinates of feature points that are parameters specific to the input from the input face image, obtaining a face region that is a region image of a face used in matching from the estimated coordinates of feature points, and collating the obtained face region with each image registered with image database 106.

First, image input section 101 receives as its input a matching-target image that is the second electronic data (S20) to output to vector calculating section 301 in parameter estimating section 105. Vector calculating section 301 arranges respective values of pixels in the second electronic data in the order of raster scan to convert into an input vector data X (S21), and outputs the data to parameter calculating section 302.

Parameter calculating section 302 substitutes the input vector data X, and feature extraction matrix $C_3$ and average vectors $M_1$ and $M_2$ obtained in the offline processing into Equation 7, and calculates the expectation vector E containing coordinates of feature points with respect to the input vector data X (S22) to output to template matching section 303.

$$E = M_2 + C_3(X - M_1) \qquad \text{Eq.7}$$

Equation 7 is to calculate coordinates of feature points of the matching-target image using the cross-correlation between N face images and coordinates of feature points of the face images obtained in the offline processing.

As in calculating the computation cost in template matching, the computation cost in the present invention is calculated using the same example. It is assumed that an input image size is 150 in vertical×150 in horizontal pixels (22500 pixels) and coordinates of both eyes (x-coordinate and y-coordinate of the right eye and x-coordinate and y-coordinate of the left eye) i.e. four dimensions are estimated with respect to the input. In this case, when the vector where the input image of 150×150 is converted into a vertical line is substituted into Equation 7 and multiplication is unit calculation, since $C_3$ is a matrix of 22500 in vertical×4 in horizontal and $(X-M_1)$ is a vector of 22500 dimensions, the number of multiplications is 4×22500=90000 (pel). In other words, even only in the multiplication, the computation cost is 1/500 that in template matching, thus resulting in great effects.

The reason for calculation using Equation 7 to enable estimation of coordinates of feature points is explained herein.

Expectation vector E indicative of coordinates of feature points obtained in Equation 7 is equal to an expectation of an output with respect to the input vector data X obtained by learning the relationship between training vectors $V_1$ and $V_2$ using the Bayes estimation on the assumption that the distributions of two vectors are normal distributions.

The Bayes estimation is a statistical estimation method for defining the distribution of population parameters and proper loss function and estimating so as to minimize the expectation of the loss function. In other words, it is understood that using Equation 7, it is possible to estimate the most likely output value with respect to the input vector data X.

Template matching section 303 calculates coordinates of feature points of the input vector data from the excitation vector E that is a combined vector of coordinates of feature points (S23), and outputs the coordinates of feature points to matching section 107.

Using the coordinates of feature points obtained in S23, matching section 107 determines a face region that is an image for use in matching with face images registered in the offline processing with image database 106.

Figure 10:
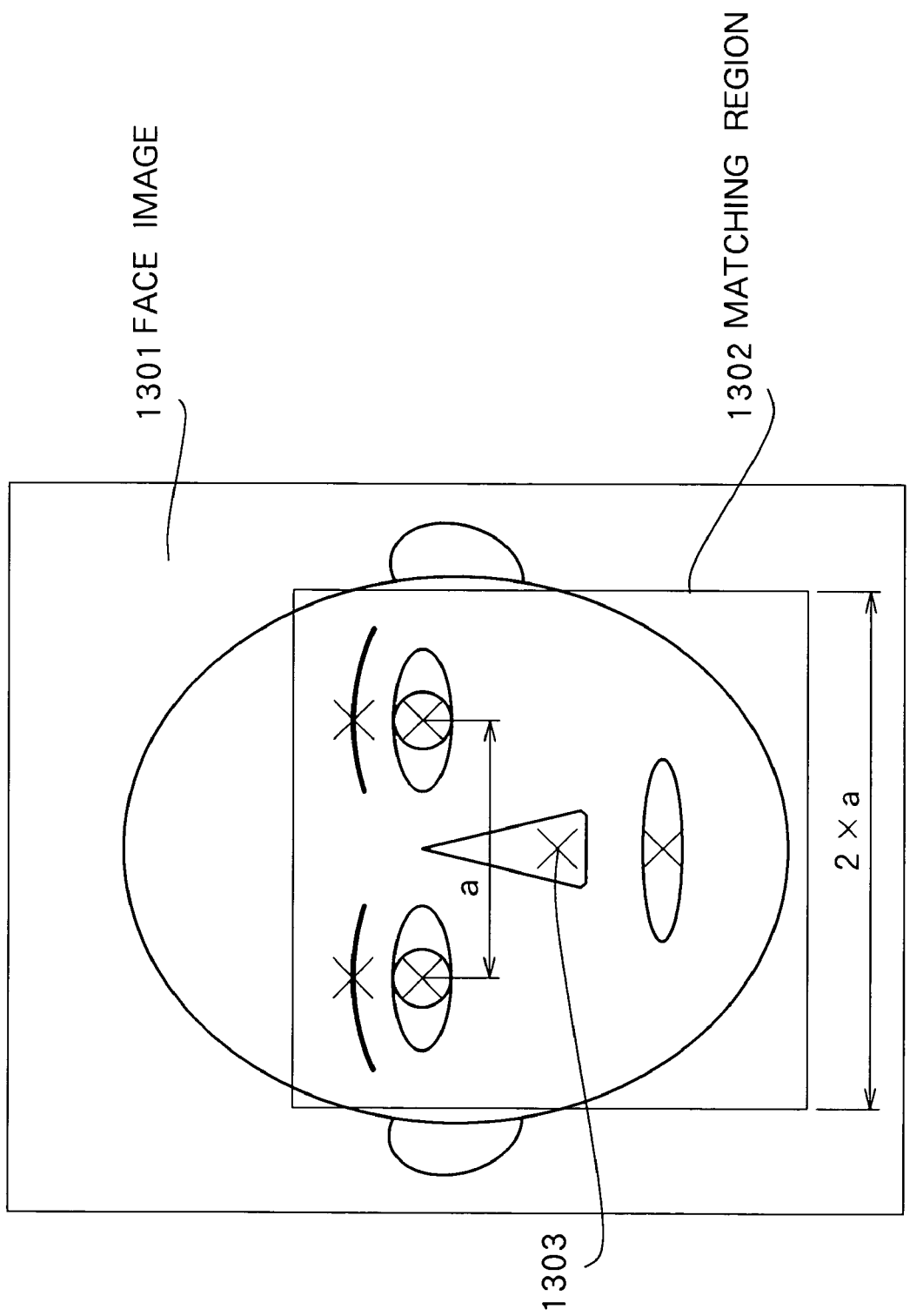
FIG. 10 is a view illustrating a face region detected in the first embodiment.

FIG. 10 shows an example of detected face region for matching. In this embodiment, a square region such that one side is twice the length of an interval "a" between both eyes and upper and lower sides are parallel to the straight line connecting both eyes is determined as matching region 1302 that is a region for use in matching.

Matching section 107 matches the image of face region 1302 with images registered in the offline processing in advance with image database 106, using a matching method, for example, the Eigenface method using the principal component analysis that is a statistical method (S25), and outputs results to output section 108 (S26).

In addition, in the Eigenface method, sizes of reference images are normalized, gray levels of all the pixels are set as an N-dimensional vector, information amounts are compressed as F-dimensional information (0<F<N) from all the reference images, and a face portion space is generated using the statistical method called the principal component analysis. Then, a region with the high probability of presence of a face is normalized from an input image, the orthogonal length to the face portion space is set as the similarity degree, and a person is recognized from a position of the projection on the face portion space.

Figure 11:
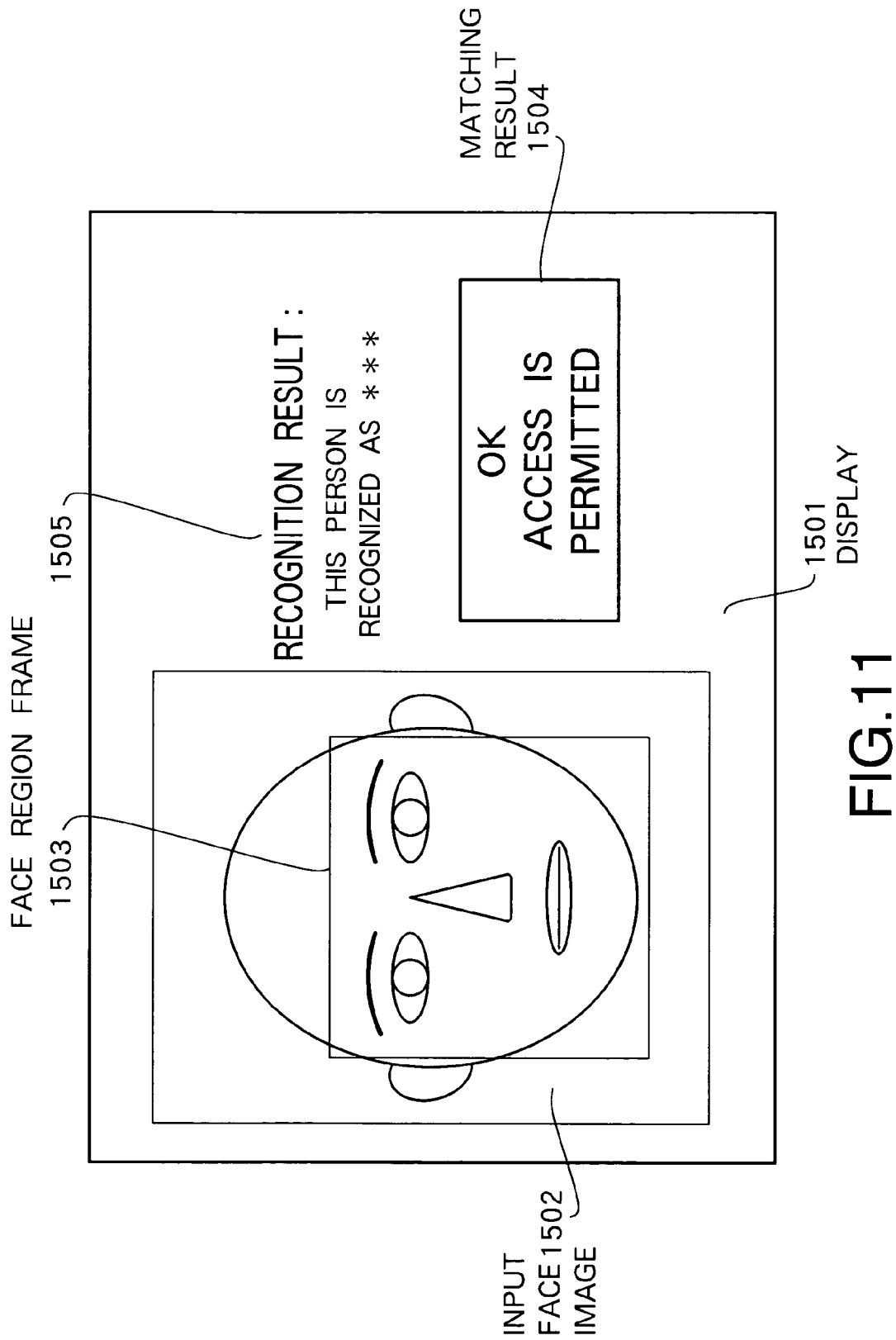
FIG. 11 is a view output to a display in the first embodiment.

FIG. 11 shows examples of outputs in output section 108. Display 1501 displays input face image 1502 and matching results 1504 and 1505 input to the display.

As described above, according to the first embodiment, using the correlation between sample face images that is the first electronic data learned beforehand in the offline processing and coordinates of feature points in the sample face images, it is possible to estimate coordinates of feature points in a matching-target face image that is the second electronic data shot in the image input section 101.

Then, it is possible to obtain a face region for matching from the coordinates of feature points estimated as described above, and compare an image of the face region for matching with face images registered beforehand in the offline processing with image database 106 to match.

Further, it is possible to estimate parameters specific to an input vector by three matrix manipulations. In other words, since it is possible to estimate the parameters with extremely smaller cost than that in search using the conventional template matching, it is possible to estimate required parameters with extremely less manipulation than that in the conventional method and to match face images with less manipulation.

Furthermore, according the first embodiment, the auto-correlation information is obtained from the covariance matrix of the first training vectors, the cross-correlation information is obtained from the covariance matrix of the first and second training vectors, the feature extraction matrix is obtained from the auto-correlation information and cross-correlation information, and coordinates of feature points of a matching-target face image are calculated from the average vector of the first training vectors, the average vector of the second training vectors, the feature extraction matrix and input vector data. Thus, since it is possible to calculate the auto-correlation information, cross-correlation information, feature extraction matrix, the average vector of the first training vectors, the average vector of the second training vectors, and coordinates of feature points of a matching-target face image simply by matrix manipulation i.e. only by matrix multiplication, the processing cost of computer becomes extremely small.

In addition, while in the first embodiment parameters are estimated using above-mentioned Equations 1 to 7, same effects may be obtained using equations other than Equations 1 to 7, as long as the equations are to beforehand obtain correlation between sample face images and coordinates of feature points in the face images, while estimating parameters using the obtained correlation.

Further, it may be possible to estimate coordinates of feature points other than the first electronic data that is sample image data.

SECOND EMBODIMENT

In contrast to the first embodiment where the training vector $V_2$ is obtained from respective coordinates of feature points of a face, the second embodiment describes obtaining the training vector $V_2$ from region images around the coordinates of feature points of a face, and automatically generating a template suitable for a matching-target face image from the matching-target face image. It is thereby possible to execute matching processing using only a sheet of template, and to reduce the computation cost greatly as compared with the conventional case of using a plurality of templates.

Specifically, in the second embodiment, the correlation is examined between sample face images that are the first electronic data shot in advance in image input section 101 and region images that are images around coordinates of feature points such as eyes, nose, mouth and eyebrows in the sample face images. Then, in the second embodiment, using the correlation, a specific region image for use in matching is obtained as a template from the matching-target face image that is the second electronic data shot in image input section 101.

Next, in the second embodiment, the matching is performed between the obtained template and the matching-target face image, coordinates of feature points of the matching-target face image are thereby estimated, and a face region image is obtained that is a region for use in matching.

In the second embodiment, the face region image is compared with each image in image database prepared in advance, and thereby matching is performed on the face image that is the second electronic data.

A data matching apparatus according to the second embodiment will be described specifically below.

A diagram illustrating a configuration of the data matching apparatus according to the second embodiment is the same as that of the data matching apparatus in the first embodiment, and descriptions thereof are omitted.

As in the first embodiment, the processing in the data matching apparatus according to the second embodiment is divided broadly into offline processing and online processing. Herein, differences from the first embodiment are particularly explained with reference to FIGS. 12 to 14.

Figure 12:
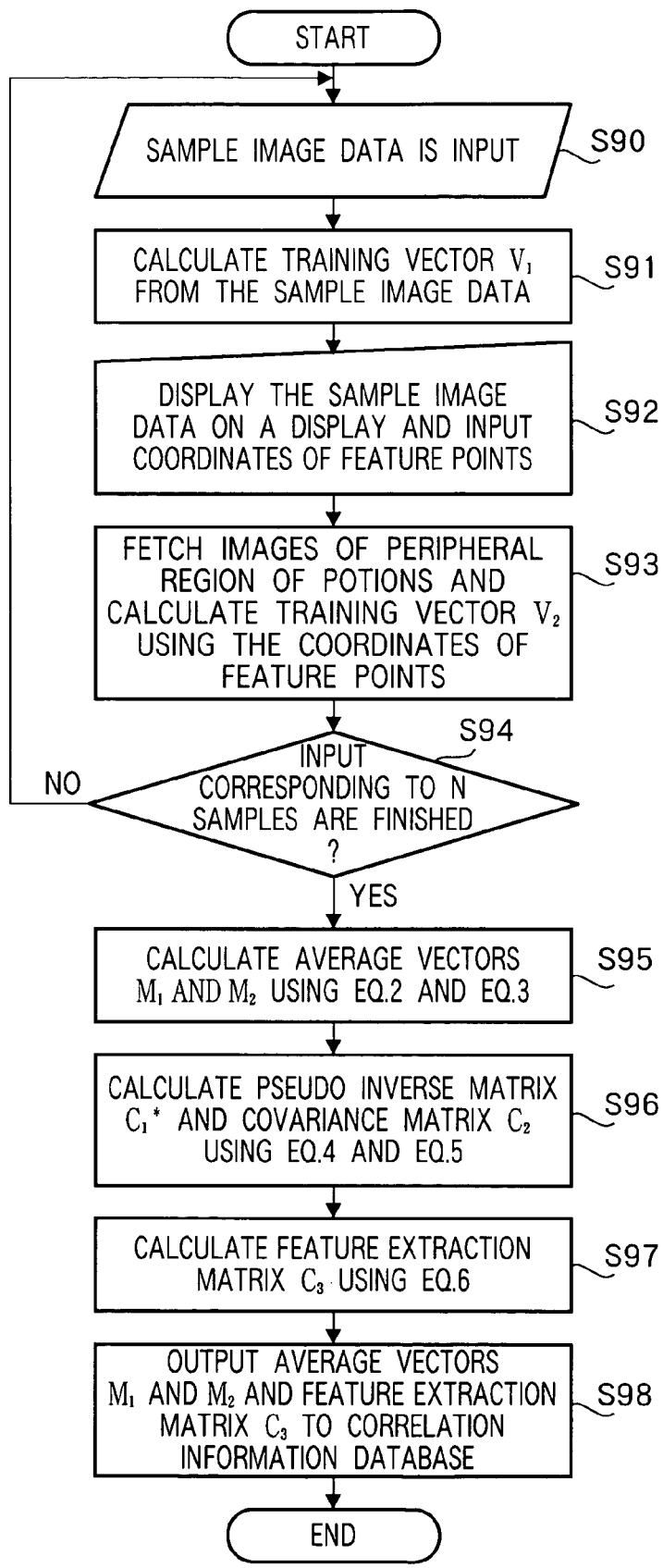
FIG. 12 is an operation flow diagram of offline processing of a data matching apparatus according to a second embodiment of the present invention.
Figure 13:
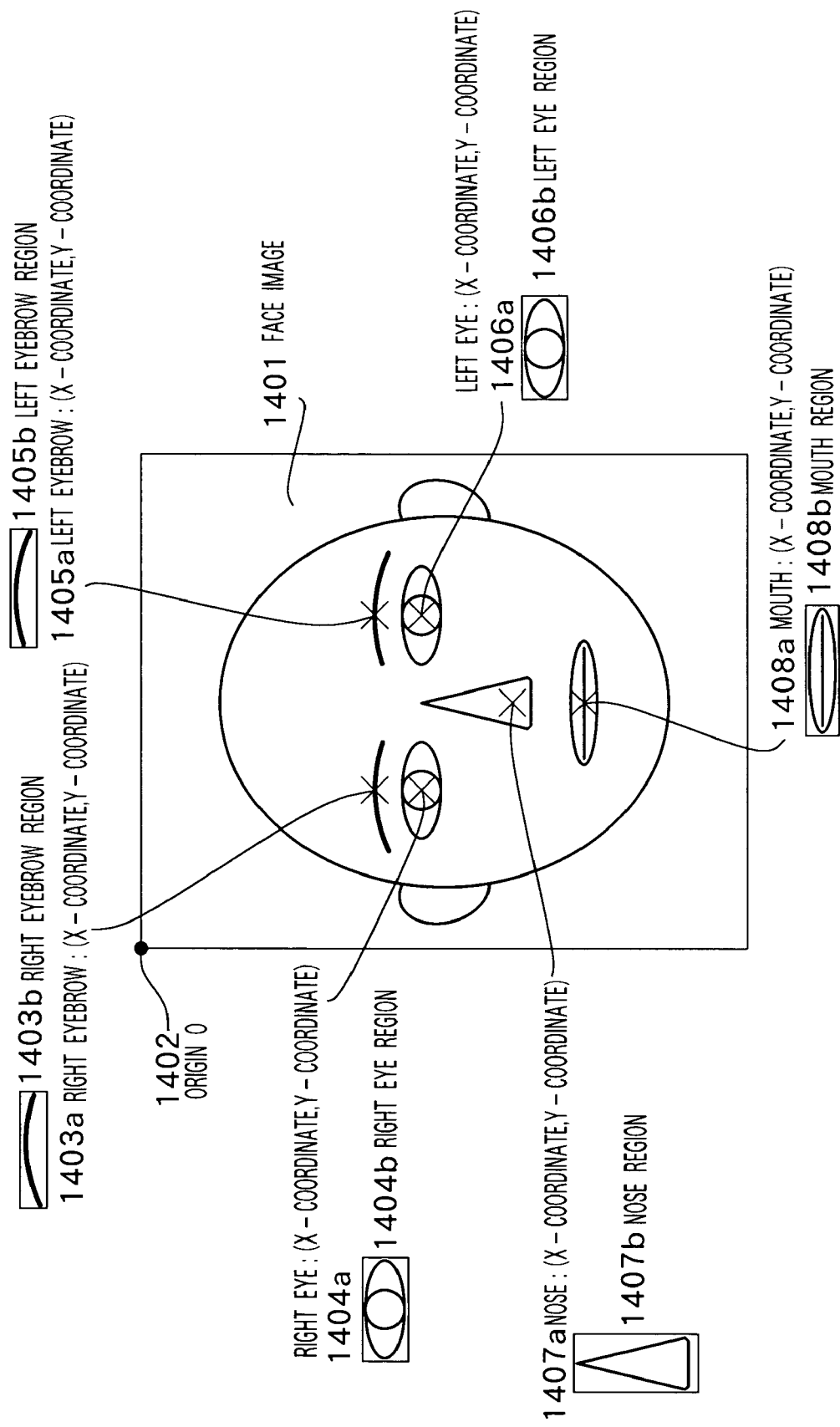
FIG. 13 is a view illustrating coordinates of feature points of a face input by a user in the second embodiment.
Figure 14:
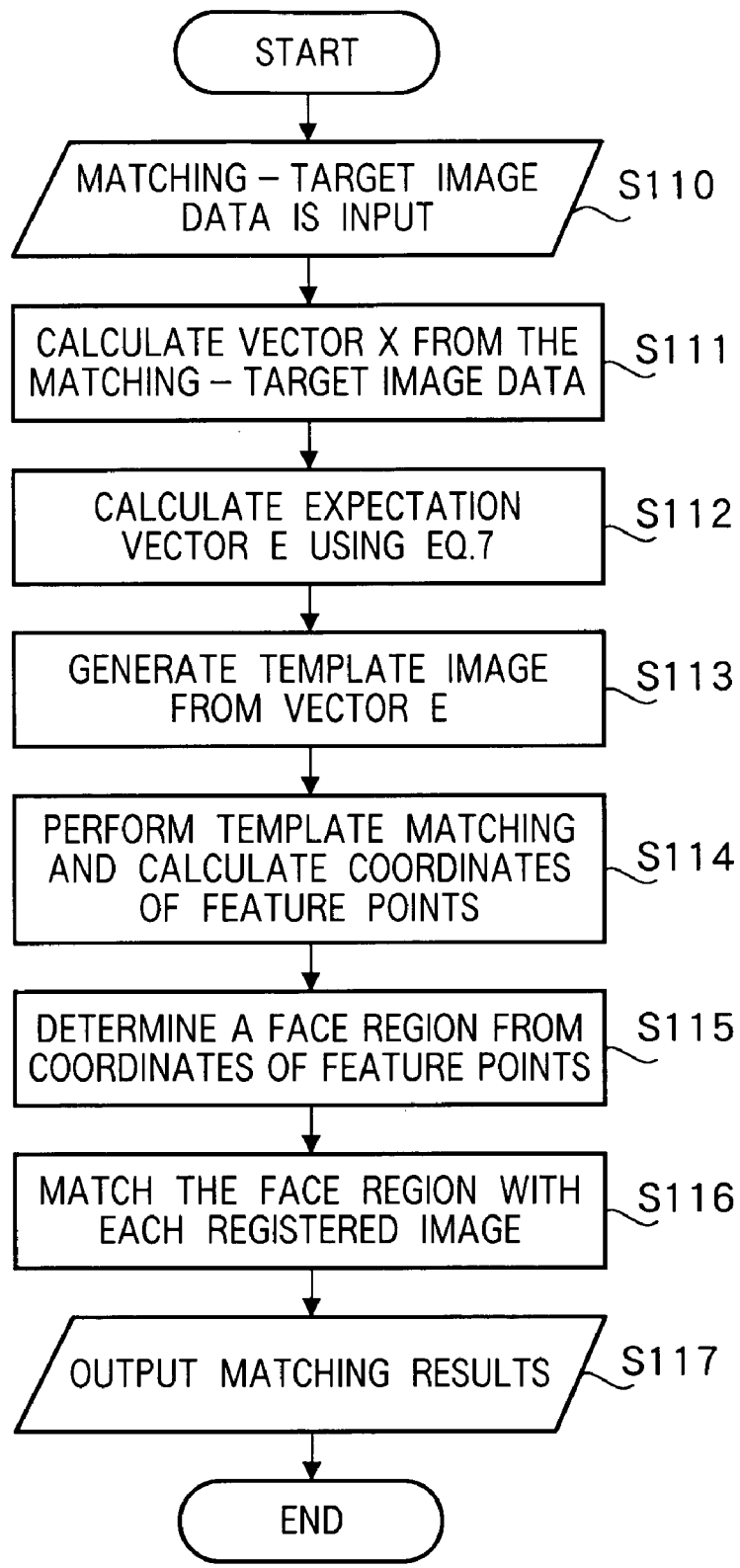
FIG. 14 is an operation flow diagram of online processing of the data matching apparatus according to the second embodiment.

FIG. 12 is an operation flow diagram illustrating the offline processing according to the second embodiment, FIG. 13 is a view illustrating region images that are images around respective coordinates of feature points from a sample face image that is the first electronic data, and FIG. 14 is an operation flow diagram illustrating the online processing.

In the offline processing in the second embodiment, the processing of S90 to S92 is the same as that of S10 to S12 illustrated in FIG. 6, the processing of S94 to S98 is the same as that of S15 to S19 illustrated in FIG. 6, and descriptions thereof are omitted.

Second training vector calculating section 201 in learning section 103 selects region images that are images around respective coordinates of feature points as illustrated in FIG. 13 from coordinates of feature points selected in S92.

Using origin 1402 of face image 1401 as the base, coordinates (x-coordinate and y-coordinate) of each of right eyebrow 1403a, right eye 1404a, left eyebrow 1405a, left eye 1406a, nose 1407a and mouth 1408a are input to second training vector calculating section 201, as coordinates of feature points.

Second training vector calculating section 201 generates right eyebrow region image 1403b, right eye region image 1404b, left eyebrow region image 1405b, left eye region image 1406b, nose region image. 1407b and mouth region image 1408b that are template images with respective coordinates of feature points of a face from input coordinates of feature points 1403a to 1408a.

As a method of determining each region image as a rectangle, using the interval "a" between both eyes obtained in FIG. 10 as the base, the width and height of each region are determined, and a region is set using the coordinate of a feature point as a center. The width and height of an eyebrow are a/2 and a/4, width and height of an eye is a/2 and a/4, width and height of the nose is "a" x⅔ and "a" x⅔, and width and height of the mouth is "a" and a/2, respectively.

Thus, by using the interval "a" between both eyes as the base, it is possible to determine each region image independently of the size of a face indicated in the face image in FIG. 13.

Second training vector calculating section 201 rearranges values of pixels in generated template images 1403b to 1408b with respective coordinates of feature points in the order of raster scan using Equation 1, and generates a combined vector with vector data as training vector $V_2$ (93).

In addition, feature extraction vector $C_3$ obtained in S97 is generated using training vector $V_2$, and therefore, are parameters to extract a region image.

The online processing according to the second embodiment will be described with reference to FIG. 14. The processing of S110 to S112 is the same as that of S20 to S22 in FIG. 9, and descriptions thereof are omitted.

Expectation vector E generated in S112 is a combined vector of template images of respective coordinates of feature points in the matching-target face image that is the second electronic data using average vectors $M_1$ and $M_2$ respectively of training vectors $V_1$ and $V_2$ obtained in S95 in the offline processing, feature extraction matrix $C_3$ obtained in S97 in the offline processing and vector X obtained in S111 in the online processing. Therefore, parameter calculating section 302 obtains template images with respective coordinates of feature points of the face from the expectation vector E (S113).

Template matching section 303 performs template matching between template images obtained in S113 and the matching-target image input from image input section 101 obtained in S110, detects regions matching the template images, and from the detected regions, determines respective coordinates of feature points of the face (S114).

Figure 1:
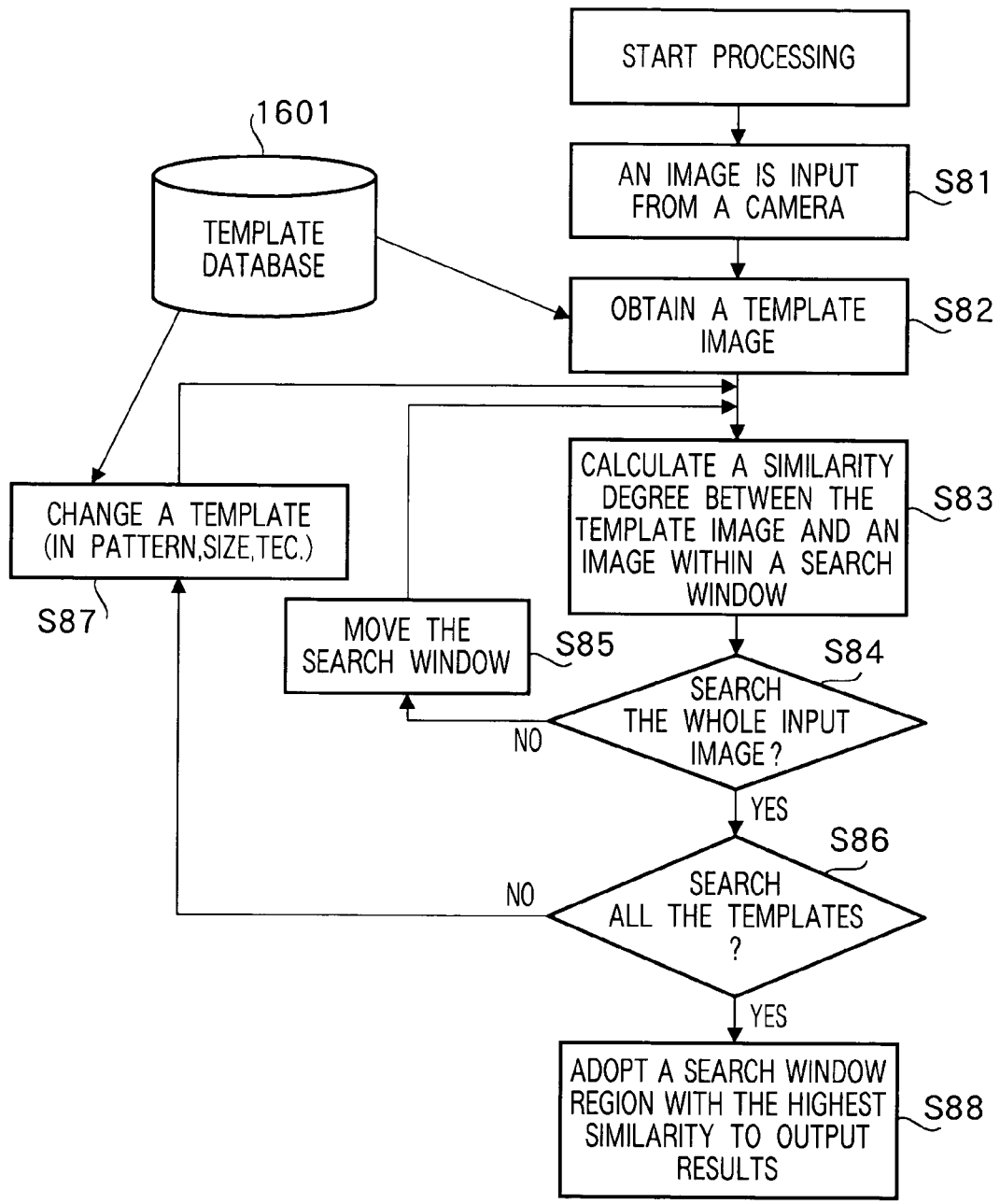
FIG. 1 is an operation flow diagram of a conventional method of extracting facial features.
Figure 2:
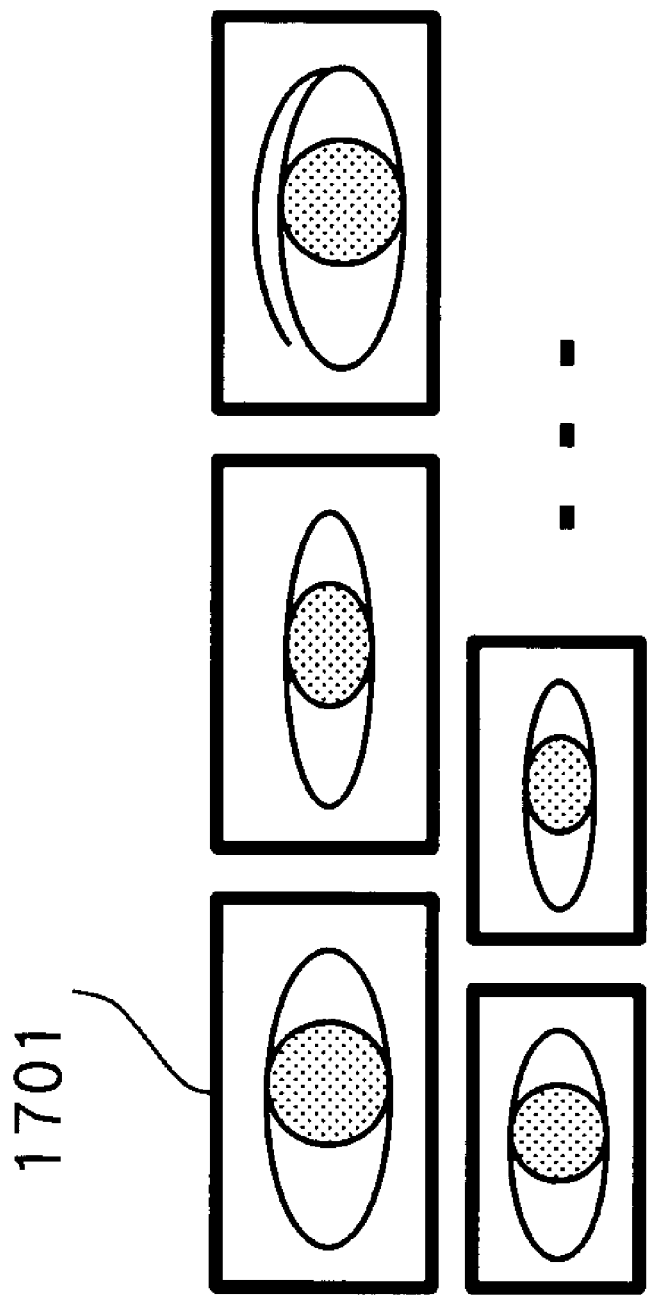
FIG. 2 shows eye templates.
Figure 3:
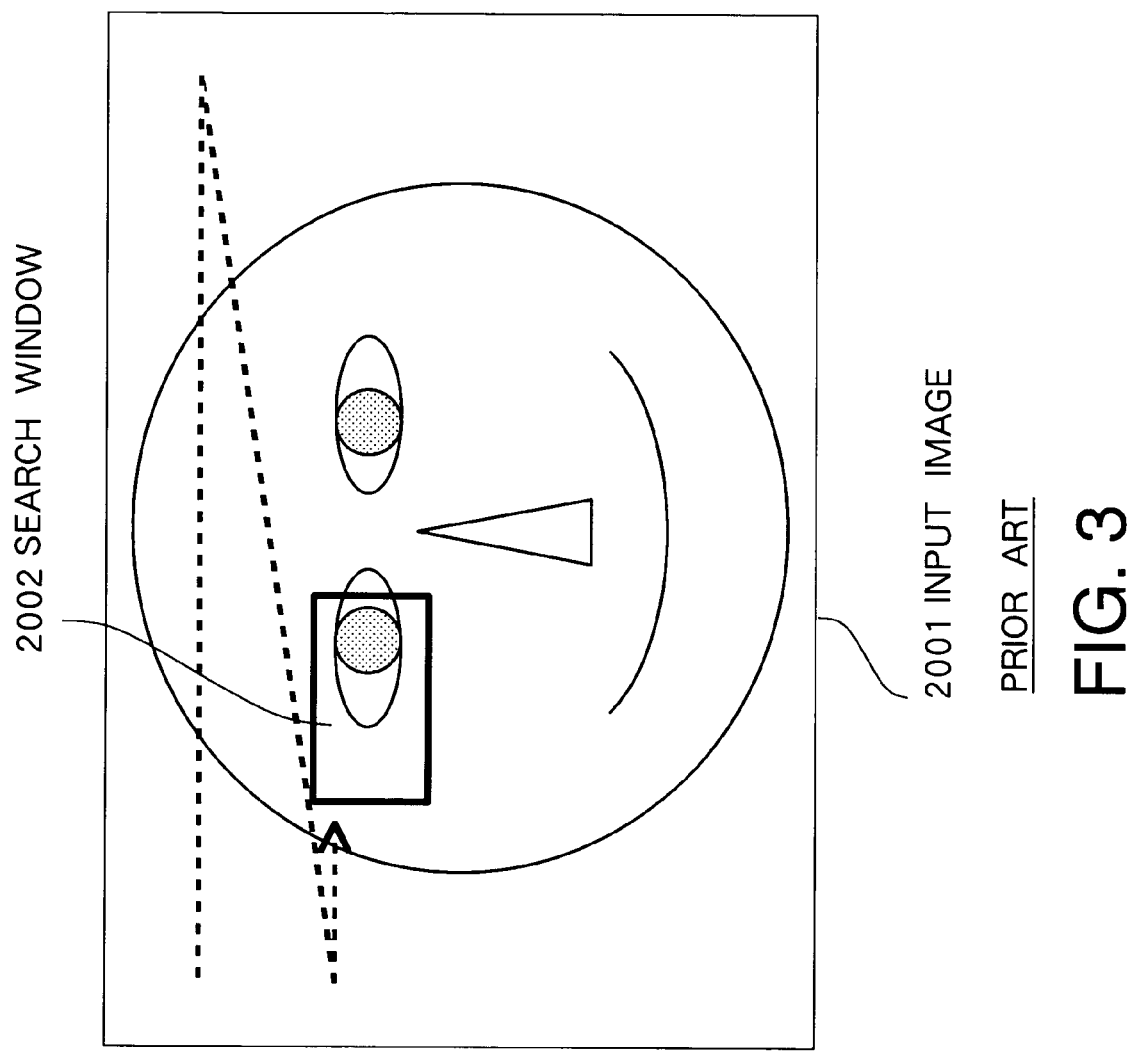
FIG. 3 is a view illustrating search by template.

In addition, the template matching processing is processing for scanning on input image 2001 with search window 2002 as illustrated in FIG. 3, and selecting a region with the highest correlation with the template image when an image in the search window is input. The correlation computation used in the template matching uses, for example, SAD correlation computation (Eq.8) and normalized correlation computation (Eq.9). In addition, in Eq.8 and Eq.9, X is an image in a search window and T is a template image.

SAD Correlation Computation $$C_{SAD} = \sum_{i=1}^{N} |X_i - T_i| \qquad \text{Eq. 8}$$

$\begin{bmatrix} C_{SAD} \text{ is an } SAD \text{ correlation value} \\ X_i \text{ is an ith pixel value of input vector} \\ T_i \text{ is an ith pixel value of a template} \\ N \text{ is the number of pixels included in the template.} \end{bmatrix}$ Normalized Correlation Computation $$C_{norm} = \frac{\sum_{i=1}^{N}(X_i - \overline{X}) \cdot (T_i - \overline{T})}{\sqrt{\sum_{i=1}^{N}(X_i - \overline{X})^2} \times \sqrt{\sum_{i=1}^{N}(T_i - \overline{T})^2}} \qquad \text{Eq. 9}$$

$\begin{bmatrix} C_{norm} \text{ is a normalized correlation value} \\ X_i \text{ is an ith value of input vector} \\ T_i \text{ is an ith value of template} \\ \overline{X} \text{ is the average of input vectors} \\ \overline{T} \text{ is the average of templates and} \\ N \text{ is the number of pixels included in the template.} \end{bmatrix}$ Subsequent processing, S115 to S117, is the same as that of S24 to S26 in FIG. 9, and descriptions thereof are omitted.

As described above, according to the second embodiment, the correlation is learned between sample images and specific region images of the sample images, specific region images of a matching-target face image are estimated using the correlation, and estimated specific region images of the matching-target face image are set as template images. In this way, since template images can be generated automatically from the matching-target face image itself, a sheet of template allows the matching processing, and it is possible to greatly reduce the computation cost as compared to the conventional case of using a plurality of templates.

Further, according to the second embodiment, it is possible to calculate coordinates of feature points of a matching-target face image from the feature extraction matrix obtained from the auto-correlation information and cross-correlation information of the first training vectors and second training vectors, the average vector of the first training vectors, the average vector of the second training vectors, and the vector data of the matching-target face image. Thus, since specific parameters can be calculated simply by matrix manipulation i.e. only by multiplication, the processing cost of computer becomes extremely small.

Furthermore, in the case of applying the second embodiment of the present invention to template image estimation in template matching, it is made possible to estimate a specific image expected from an input image, and perform matching processing using the specific image as a template. In other words, since the processing can be executed using a template of one pattern, it is possible to reduce calculation cost as compared to a multi-template method of preparing a plurality of templates different in patterns and sizes corresponding to versatility of input images like the conventional template matching.

THIRD EMBODIMENT

The third embodiment of the present invention describes obtaining the training vector $V_2$ from combined vectors of respective coordinates of feature points of a face and region images around the respective coordinates of feature points, in contrast to the first embodiment where the training vector $V_2$ is obtained from respective coordinates of feature points of a face and to the second embodiment where the training vector $V_2$ is obtained from region images around respective coordinates of feature points of a face.

Then, coordinates of feature points of a matching-target face image are estimated from thus obtained training vectors $V_2$, a template suitable for the matching-target face image is automatically generated from the matching-target face image, and using the automatically generated template with peripheral regions of coordinates of feature points, matching is performed.

It is thereby possible to limit a search range of the template, and perform the matching processing using a sheet of template. As a result, it is possible to greatly reduce cost as compared to the case of searching the entire region of a matching-target face image and using a plurality of templates as in the conventional method.

A data matching apparatus according to the third embodiment will be described specifically below.

A diagram illustrating a configuration of the data matching apparatus according to the third embodiment is the same as that of the data matching apparatus in the first embodiment, and descriptions thereof are omitted.

As in the first embodiment, the processing of the data matching apparatus according to the third embodiment is divided broadly into offline processing and online processing. Herein, particularly, differences from the first and second embodiments are explained with reference to FIGS. 15 and 16.

Figure 15:
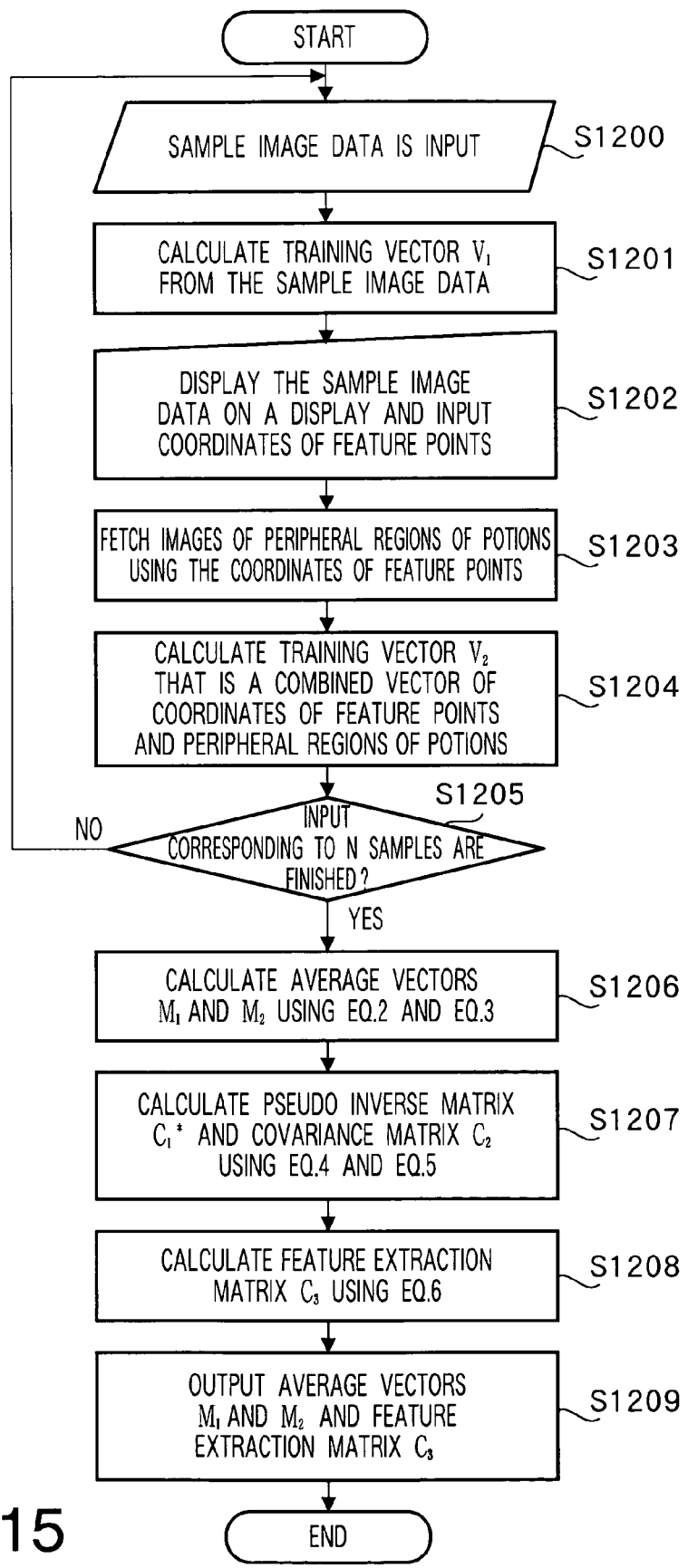
FIG. 15 is an operation flow diagram of offline processing of a data matching apparatus according to a third embodiment of the present invention.
Figure 16:
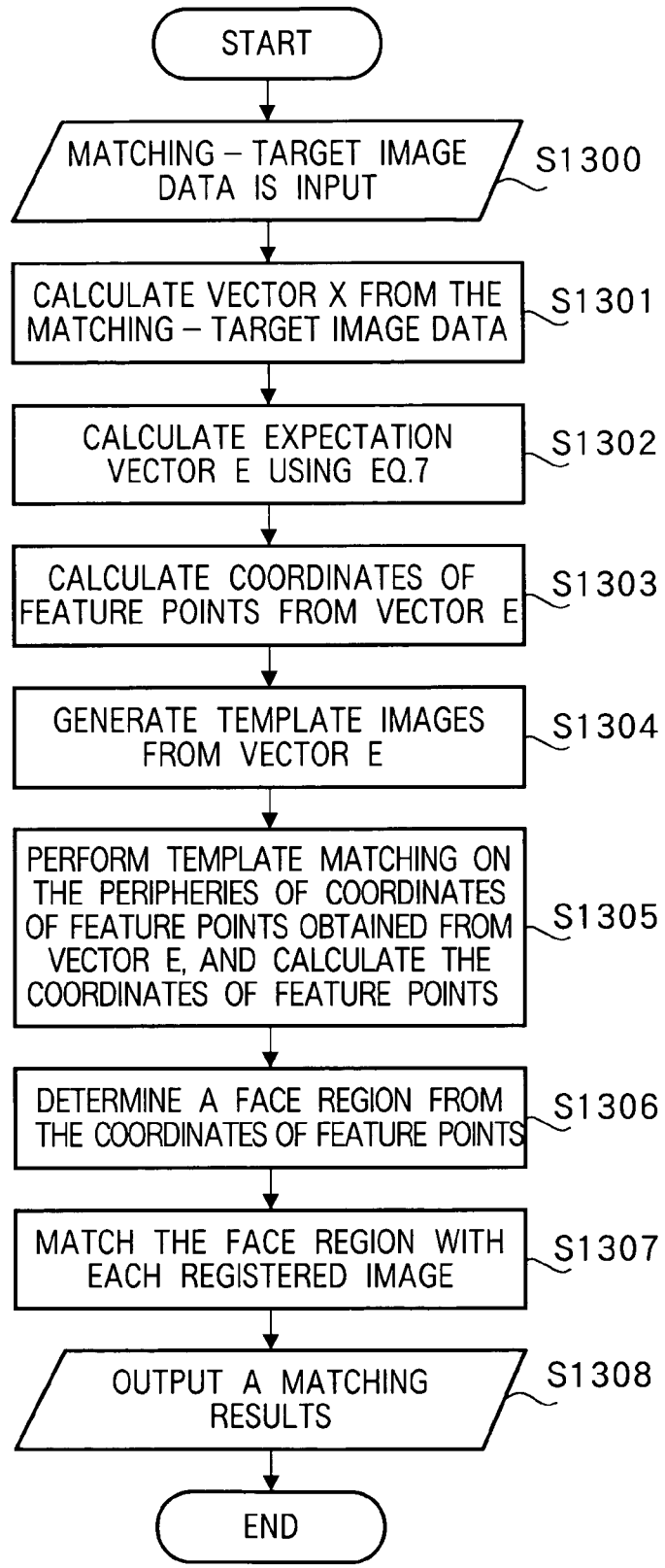
FIG. 16 is an operation flow diagram of online processing of the data matching apparatus according to the third embodiment.

FIG. 15 is an operation flow diagram illustrating the offline processing according to the third embodiment, and FIG. 16 is an operation flow diagram illustrating the online processing.

In the offline processing in the second embodiment, processing of S1200 to S1202 is the same as that of S10 to S12 shown in FIG. 6, processing of S1205 to S1209 is the same as that of S15 to S19 shown in FIG. 6, and descriptions thereof are omitted.

In S1202, parameter input section 102 selects region images that are images around coordinates of feature points as shown in FIG. 13 from selected coordinates of feature points (S1203).

Using Eq.1, learning section 103 generates a combined vector of vector data where respective coordinates of facial feature points are arranged sequentially and combined and another vector data where respective pixel values constituting generated template images 1403b to 1408b with the respective coordinates of facial feature points are arranged in the order of rater scan, as training vector $V_2$ (S1204).

In addition, feature extraction vector $C_3$ obtained in S1208 is generated using training vector $V_2$, and therefore, are parameters to extract coordinates of feature points and region images.

The online processing will be described with reference to FIG. 16. The processing of S1300 to S1303 is the same as that of S20 to S22 in FIG. 9, the processing of S1306 to S1308 is the same as that of S24 to S26 in FIG. 9, and descriptions thereof are omitted.

Expectation vector E generated in S1302 is a combined vector of template images of respective coordinates of feature points in the matching-target face image that is the second electronic data using average vectors $M_1$ and $M_2$ respectively of training vectors $V_1$ and $V_2$ obtained in offline processing S1206, feature extraction matrix $C_3$, for extracting coordinates of feature points and region images obtained in S1208, and vector X obtained in S1301 in the online processing. Therefore, parameter calculating section 302 obtains coordinates of feature points in the matching-target face image in S1303, and template images that are region images in S1304, from the expectation vector E.

Template matching section 303 performs template matching on the peripheries of coordinates of feature points between template images obtained in S1304 and the matching-target image input from image input section 101 obtained in S1300, detects regions matching the template images, and from the detected regions, determines respective coordinates of feature points of the face (S1305).

As in the first embodiment, the correlation computation used in the template matching uses SAD correlation computation (Eq.8) and normalized correlation computation (Eq.9), for example.

As described above, according the third embodiment, a combined vector is estimated from respective coordinates of feature points in a matching-target face image and region images of the respective coordinates of feature points, and a search range is limited to the peripheries of estimated respective coordinates of feature points of the face.

Further, hierarchical search can be performed such that template matching search is performed on the limited search range, using region images of estimated respective coordinates of feature points as template.

In this way, the detection precision is improved due to the hierarchical search, while the search range is decreased, and the template to use is only a single sheet of estimated one, enabling detection with less computation cost than in the conventional case.

Further, according to the third embodiment, the auto-correlation is obtained by calculating the covariance matrix of the first training vector, and the cross-correlation is obtained by calculating the covariance matrix of the first and second training vectors. Thus, the auto-correlation and cross-correlation can be obtained simply by matrix manipulation i.e. only by multiplication, and therefore, the processing cost becomes extremely small.

FOURTH EMBODIMENT

The fourth embodiment of the present invention provides a vehicle image matching apparatus where a parameter estimation apparatus is applied to matching of vehicle images.

The vehicle image matching apparatus detects coordinates of feature points such as a number plate, lights and driver sheet from images of contrast pattern or the like including a vehicle on a road shot in image input section 101, using the Bayes estimation. Then, the vehicle image matching apparatus matches data to check whether the image of the entire vehicle obtained based on obtained coordinates of feature points and features such that numbers of the number plate match those of a vehicle registered in advance.

A diagram illustrating a configuration of the vehicle image matching apparatus is the same as FIG. 4 in the first embodiment, and descriptions thereof are omitted.

The processing in the vehicle image matching apparatus is divided broadly into offline processing and online processing. Herein, particularly, differences from the first embodiment are explained with reference to FIGS. 17 to 19.

Figure 17:
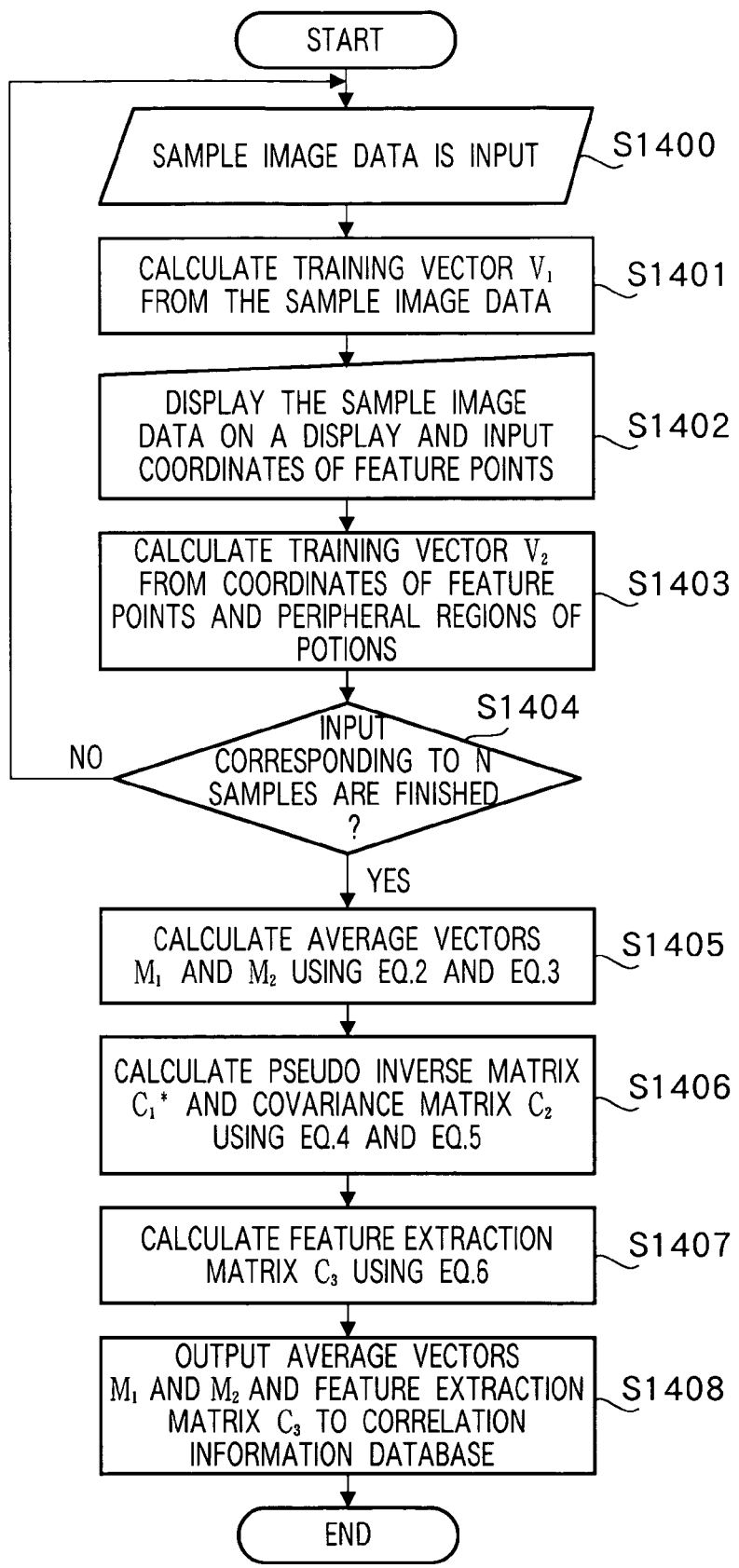
FIG. 17 is an operation flow diagram of offline processing of a vehicle image matching apparatus according to a fourth embodiment of the present invention.

FIG. 17 is an operation flow diagram illustrating the offline processing according to the fourth embodiment.

The processing of S1401 and S1405 to S1408 in FIG. 17 is the same as that the processing of S11 and S16 to S19 in FIG. 6 in the first embodiment, and descriptions thereof are omitted.

Image input section 101 inputs N vehicle images for use in matching to parameter input section 102, learning section 103 and image database, as input first electronic data (S1400).

First training vector calculating section 202 in learning section 103 calculates first training vector $V_1$ (S1401).

A display included in parameter input section 102 displays coordinates of feature points of the vehicle image on a sheet basis. When a user selects coordinates of feature points of the vehicle image using a mouse included in parameter input section 102, parameter input section 102 outputs selected coordinates of feature points to leaning section 103 (S402).

Figure 18:
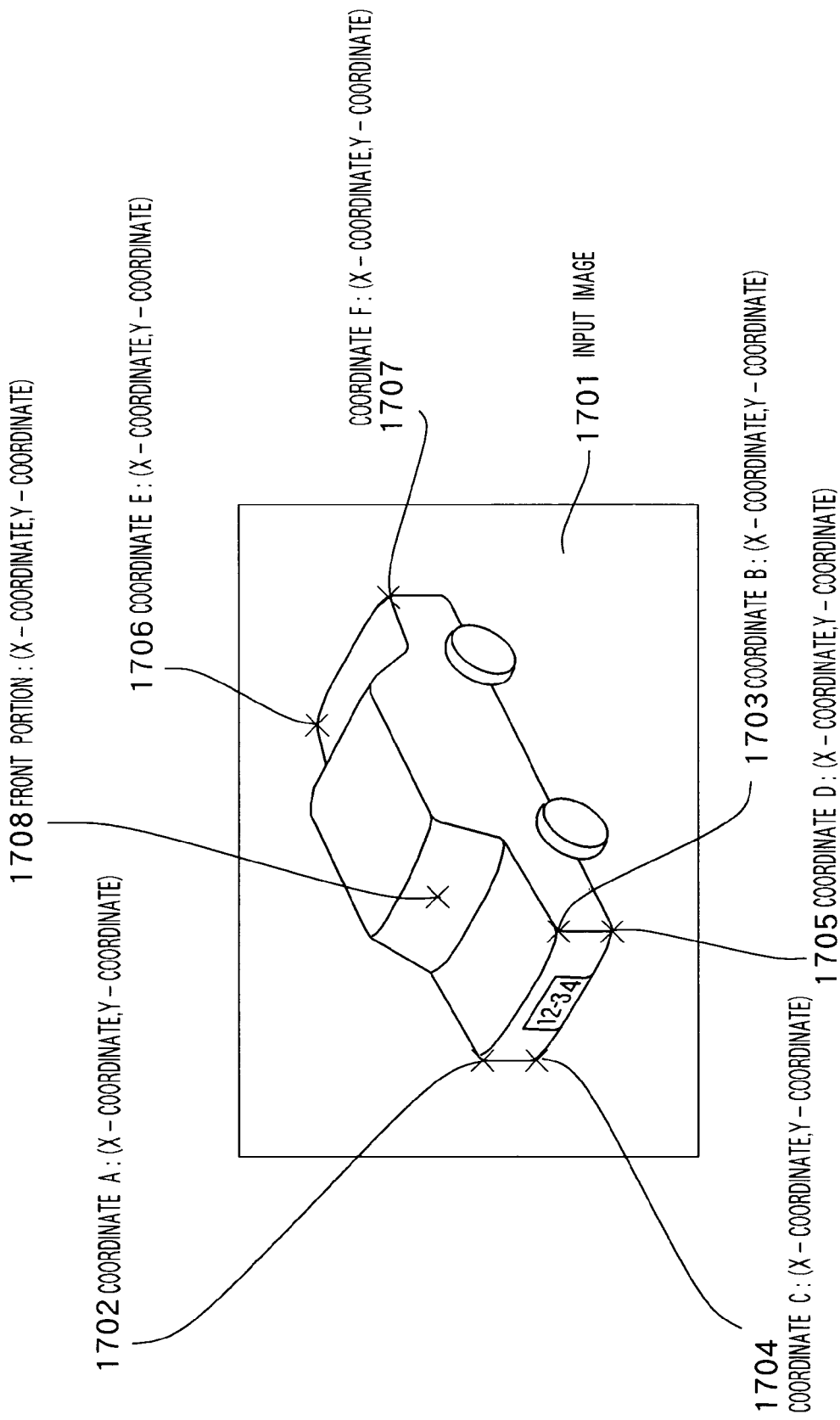
FIG. 18 is a view illustrating coordinates of feature points of a vehicle image input by a user in the fourth embodiment.

FIG. 18 shows coordinates of feature points of the vehicle image. As coordinates of feature points of the vehicle in input image 1701, front portion 1708 and coordinates A 1702 to coordinates F 1707 that are vertexes of the vehicle are input.

Second vector calculating section 210 in learning section 103 calculates second training vector $V_2$ from the input coordinates of feature points (S1403).

Parameter input section 102, second training vector calculating section 201 and first training vector calculating section 202 in learning section 103 determine whether the processing corresponding to N vehicles is finished (S1404), and when the processing is finished, the processing flow proceeds to S1405, while shifting to S1400 when the processing is not finished.

Subsequent processing, S1405 to S1408, is the same as that of S16 to S19 shown in FIG. 6 i.e. the same as in the first embodiment, and descriptions thereof are omitted.

The online processing will be described below with reference to the operation flow shown in FIG. 19.

A purpose of the online processing is estimating coordinates of required feature points from the input vehicle image, and using the coordinates of feature points, analyzing and storing the vehicle image and images of the number plate and front portion.

Figure 19:
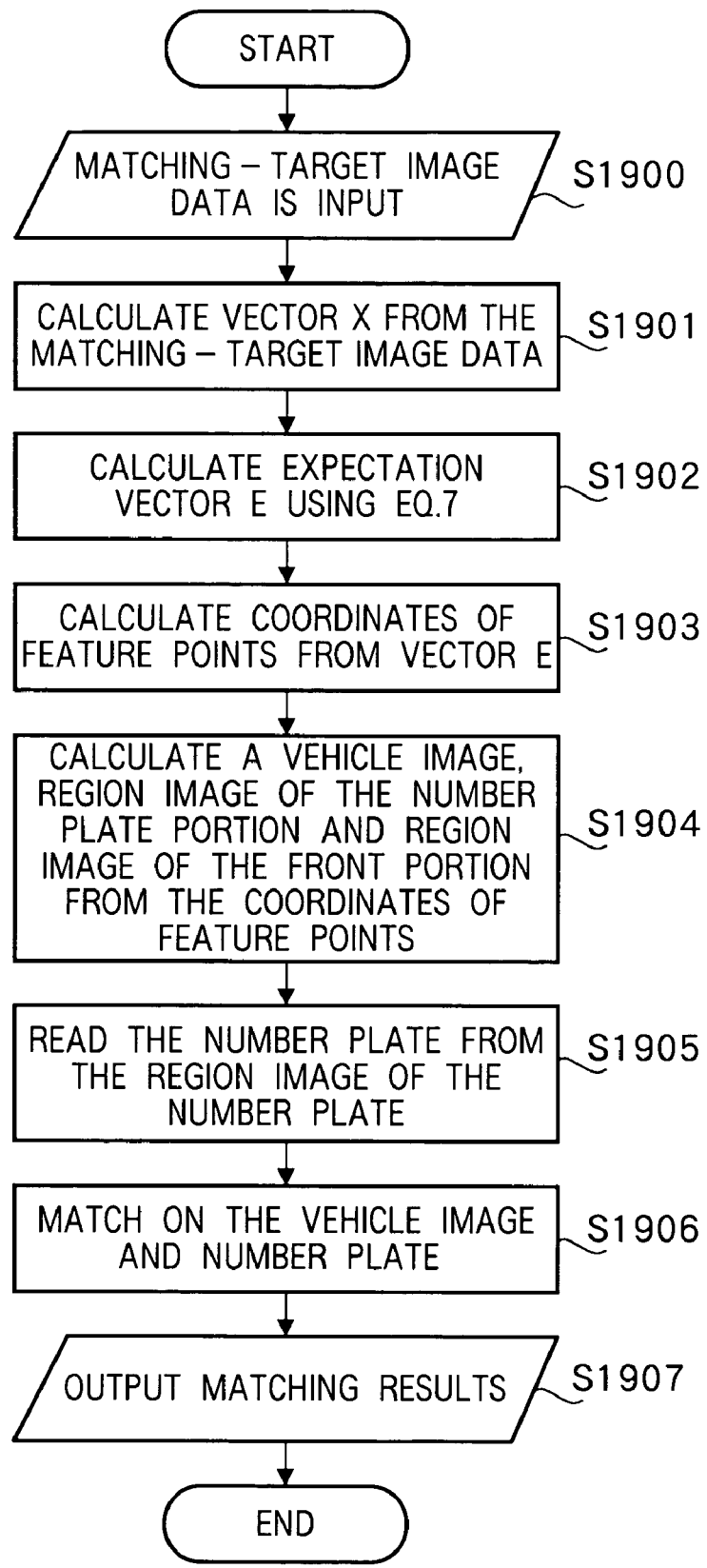
FIG. 19 is an operation flow diagram of online processing of the vehicle image matching apparatus according to the fourth embodiment.

The processing of S1900 to S1903 and S1906 in FIG. 19 is the same as that of S20 to S23 and S26 as in the first embodiment, and descriptions thereof are omitted.

Matching section 107 determines an interval as the base from coordinates of feature points obtained in S1903, and based on the interval, and fetches the vehicle image, region image of the number plate portion and region image of the front portion (S1904).

Then, matching section 107 reads numbers on the number plate of the vehicle, for example, by scanning the region image of the number plate portion using a scanner (S1905).

Further, matching section 107 matches the vehicle image and number plate with images registered in advance in the offline processing with image database 106, using a matching method, for example, the Eigenface method (S1906).

Figure 20:
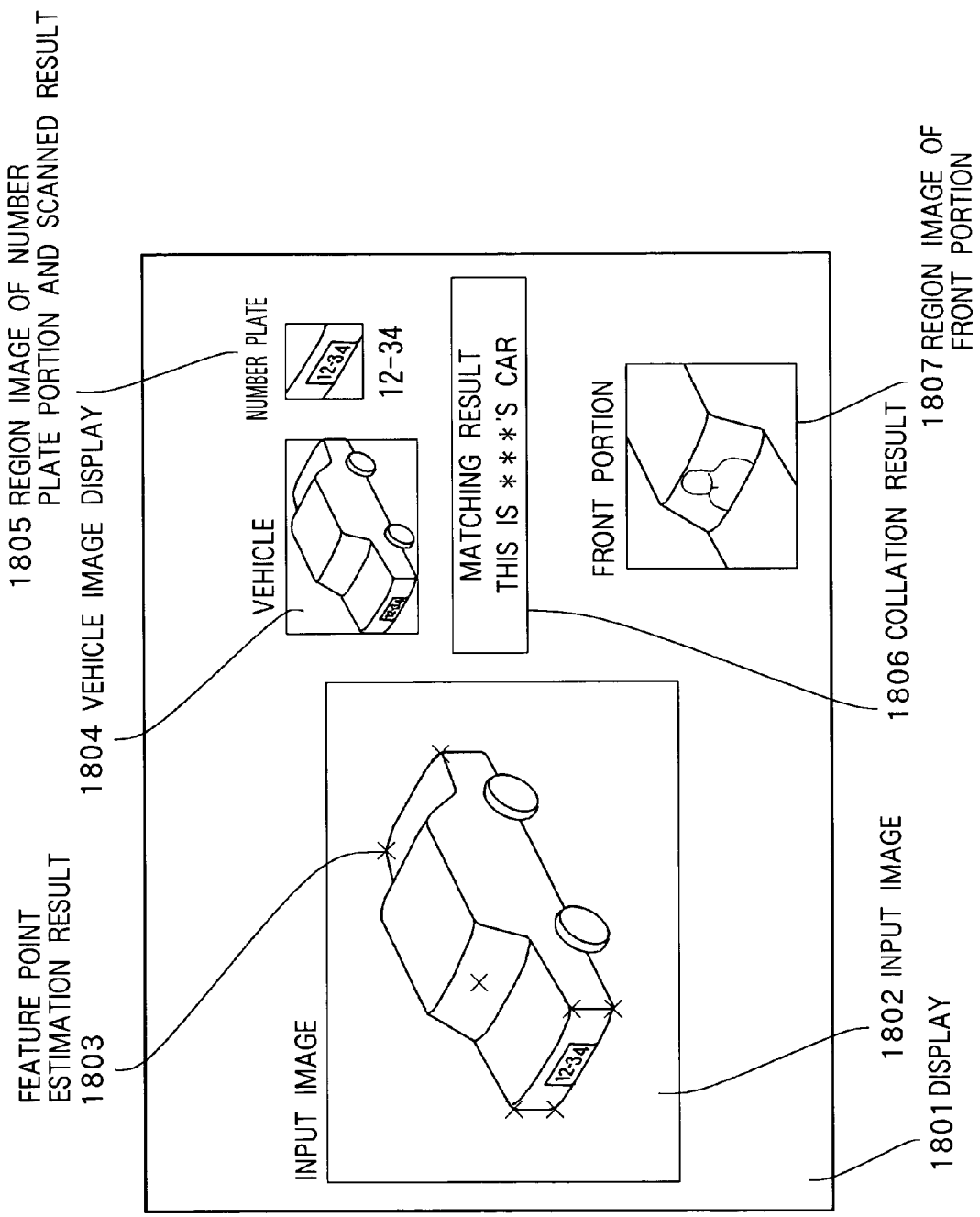
FIG. 20 is a view output to a display in the fourth embodiment.

FIG. 20 shows display examples of input image 1802, vehicle image 1804, region image of number plate portion and scanned result 1805, matching result 1806, and region image of front portion 1807.

As described above, according to the fourth embodiment, by graphically showing an input vehicle image and estimated coordinates of feature points, scanning the image of the entire vehicle, the image of the number plate portion, and numbers of the number plate portion based on the coordinates of feature points, and displaying results from collating with vehicles registered in advance and enlarged images of the driver seat and passenger seat, it is possible to readily understand the information of the vehicle and state of the driver.

In addition, while in the fourth embodiment the parameter estimating method in the first embodiment is used, it may be possible to apply the second or third embodiment to a vehicle image matching apparatus.

FIFTH EMBODIMENT

The fifth embodiment of the present invention copes with input matching-target images which have various distributions when fluctuations exist on the distributions of input vectors that are the input sample images.

Specifically, combined information of input sample images and coordinates of feature points are divided into a plurality of distributions, correlation between a matching-target image and coordinates of feature points of the matching-target images is studied for each distribution, and using the correlations, coordinates of feature points of the matching-target image are obtained.

Further, the processing of data matching apparatus according to the fifth embodiment is divided broadly into offline processing and online processing, as in the first embodiment. Herein, differences from the first embodiment are particularly explained with reference to FIGS. 21 to 23.

Figure 23:
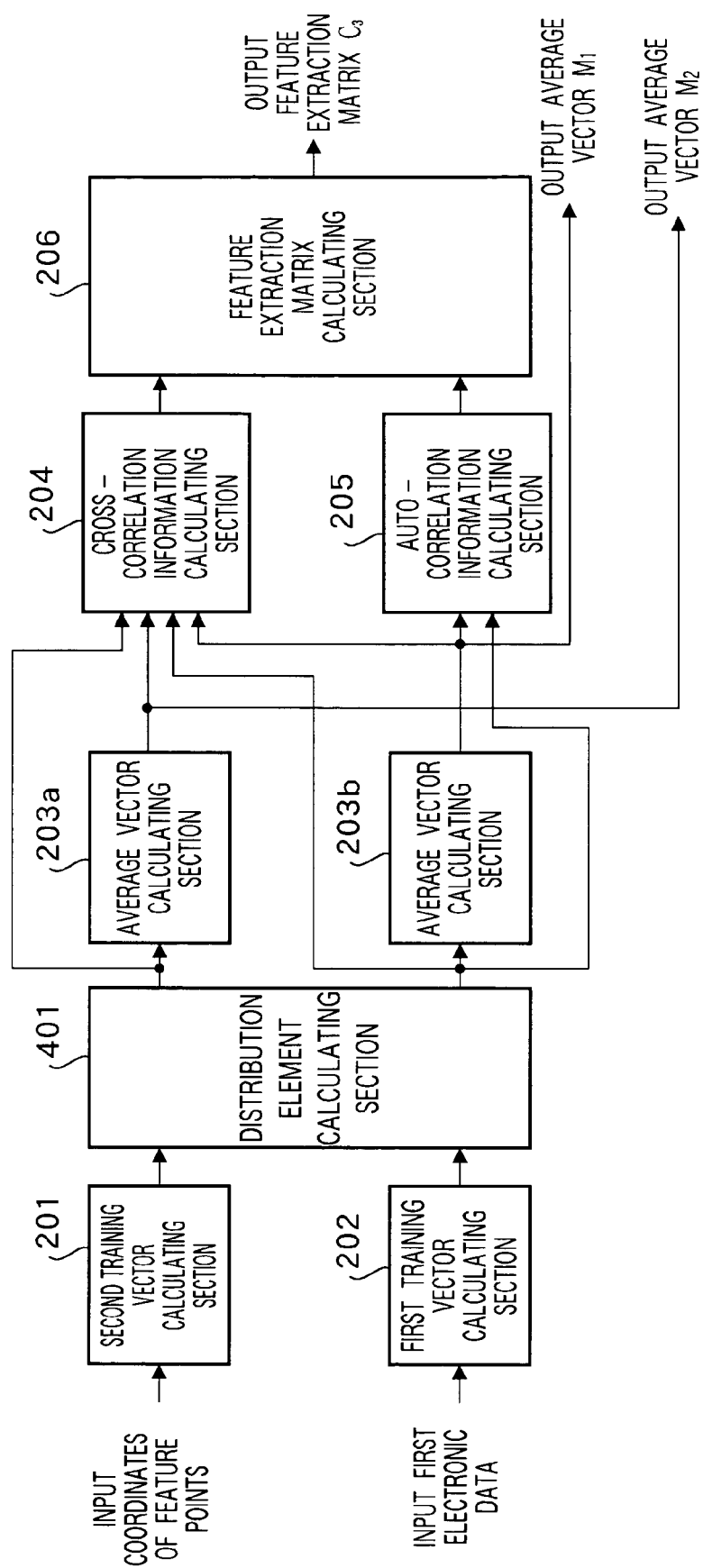
FIG. 23 is a diagram illustrating a learning section according to the fifth embodiment.

A diagram illustrating a configuration of the data matching apparatus according to the fifth embodiment is the same as that of the data matching apparatus in the first embodiment, and descriptions thereof are omitted, except learning section 103 as illustrated in FIG. 23. "401" denotes a distribution element calculating section that classifies a plurality of first training vectors and second training vectors into element distributions based on the probability distribution.

Figure 21:
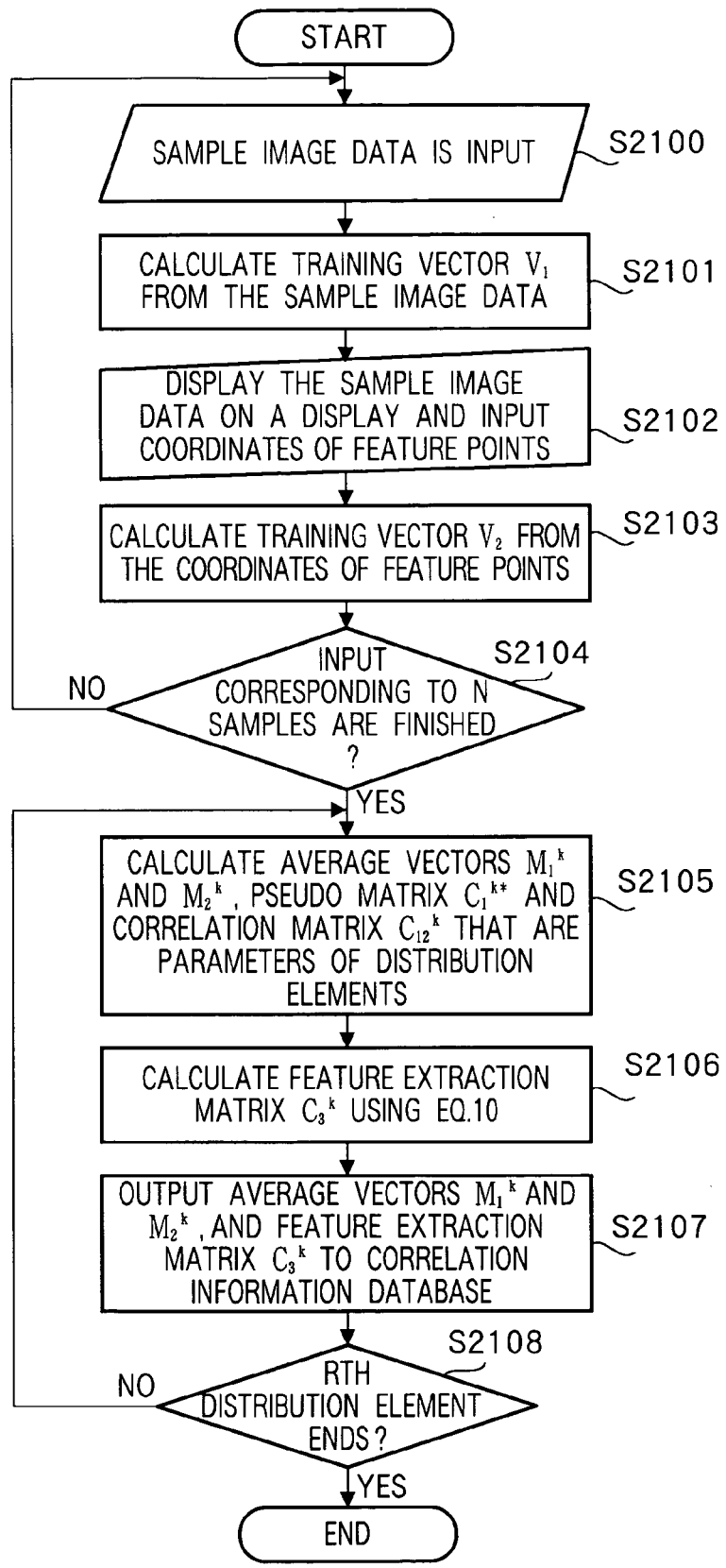
FIG. 21 is an operation flow diagram of offline processing of a data matching apparatus according to a fifth embodiment of the present invention.
Figure 22:
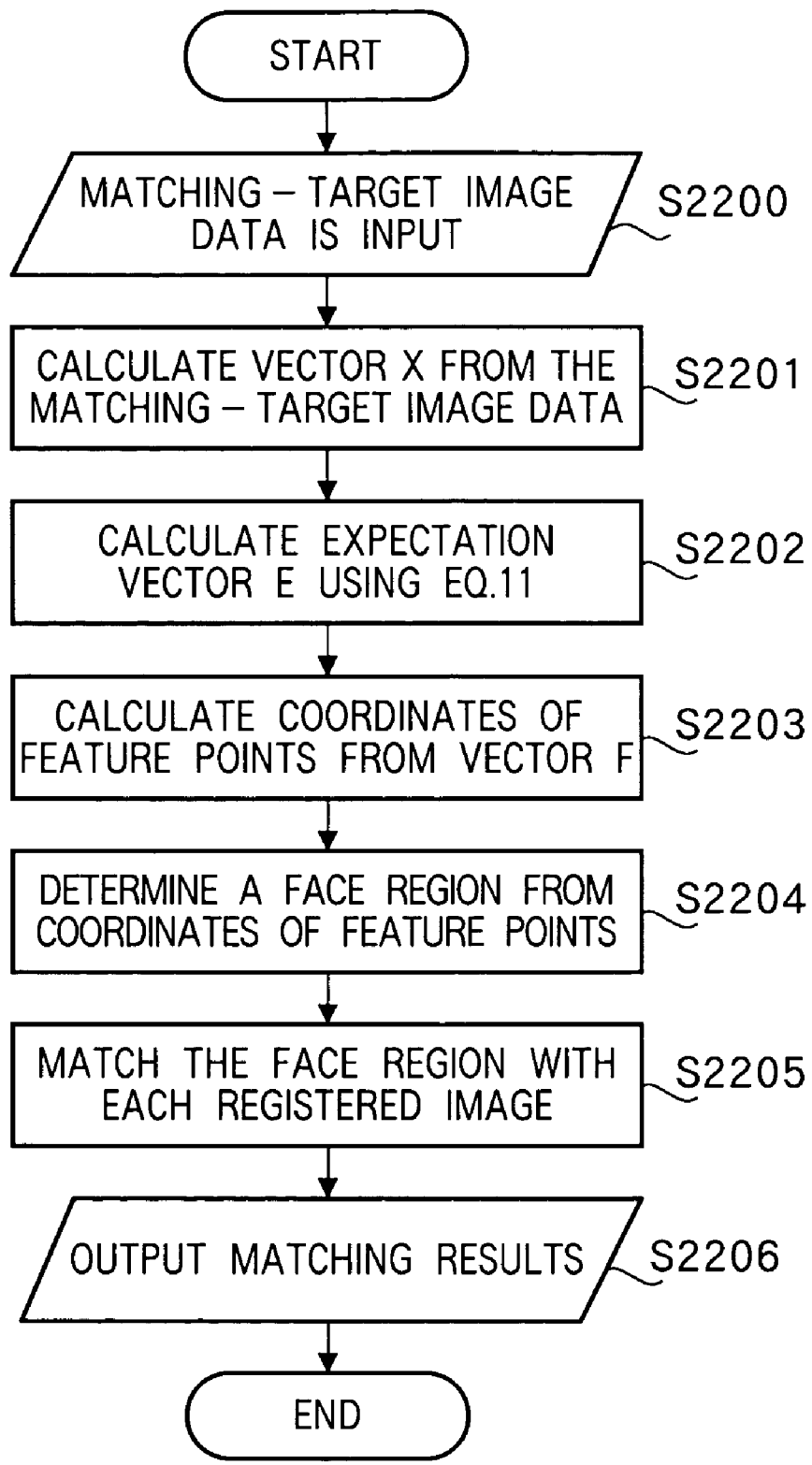
FIG. 22 is an operation flow diagram of online processing of the data matching apparatus according to the fifth embodiment.

FIG. 21 is a view illustrating an operation flow of the offline processing according to the fifth embodiment, and FIG. 22 is a view illustrating an operation flow of online processing.

The processing of S2100 to S2104 in the offline processing is the same as that of S10 to S15 illustrated in FIG. 6 as in the first embodiment, and descriptions thereof are omitted.

After confirming input of N items of first electronic data in S2104, distribution element calculating section 401 constitutes combined vectors of training vectors $V_1$ and $V_2$ of N people. Then, distribution element calculating section 401 models the probability distribution in a set of combined vectors of N people to element distributions with R distributions using Gaussian mixed model (hereafter referred to as GMM), and outputs the first training vector and second training vector for each element distribution to average calculating section 203a.

Average vector calculating section 203a, average vector calculating section 203b, cross-correlation information calculating section 204 and auto-correlation information calculating section 205 calculate parameters of kth (k=1, ..., R) element distribution in modeling.

In other words, average vector calculating section 203b calculates the average vector $M_1^k$ of vector $V_1$ belonging to the kth element distribution, average vector calculating section 203a calculates the average vector $M_2^k$ of vector $V_2$ belonging to the kth element distribution, the auto-correlation information calculating section calculates $C_1^{k*}$ that is the pseudo inverse matrix of the covariance matrix $C_1^k$ of vector $V_1$, and the cross-correlation information calculating section calculates cross-correlation matrix $C_{12}^k$ of vectors $V_1$ and $V_2$ (S1205).

Average vector calculating section 203b outputs the average vector $M_1^k$ to auto-correlation information calculating section 205 and cross-correlation information calculating section 204, and average vector calculating section 203a outputs the average vector $M_2^k$ to cross-correlation information calculating section 204.

Generally, the EM (Expectation Maximization) algorithm is used for the calculation, which is described in detail in Christopher M. Bishop, Oxford, "Neural Networks for Pattern Recognition" pages 59 to 73 (1995).

Auto-correlation information calculating section 206 calculates feature extraction matrix $C_3^k$ from obtained pseudo inverse matrix $C_1^{k*}$ of the covariance matrix of vector $V_1$ and cross-correlation matrix $C_{12}^k$, according to Equation 10 (S2106).

$$C_3^K = C_{12}^K C_1^{K*} \qquad \text{Eq.10}$$

$C_1^{K*}$ is the pseudo inverse matrix of matrix $C_1^k$.

Feature extraction matrix calculating section 206 outputs average vectors $M_1^k$ and $M_2^k$ and feature extraction matrix $C_3^k$ to a correlation information database (S1207).

When average vectors $M_1^k$ and $M_2^k$ and feature extraction matrix $C_3^k$ of each of R distributions are stored in the correlation information database, learning section 103 finishes the offline processing. Meanwhile, when average vectors $M_1^k$ and $M_2^k$ and feature extraction matrix $C_3^k$ of each of R distributions are not stored in the correlation information database, learning section 103 repeats the processing of S2105 to S2107 (S2108).

The online processing in the fifth embodiment will be described below with reference to the operation flow diagram shown in FIG. 22.

The processing of S2200, S2201 and S2203 to S2206 in the online processing in the fifth embodiment is the same as that of S20, S21 and S22 to S26 in FIG. 9 as in the first embodiment, and descriptions thereof are omitted.

With respect to input vector data X calculated in S2201, parameter calculating section 302 calculates an expectation vector E of coordinates of feature points with respect to the input vector data X from feature extraction matrix $C_3^*$ and average vectors $M_1$ and $M_2$ obtained in the offline according to Equation 11 (S2202).

$$E = \frac{\sum_{K=1}^{R} P(w_K|X)[M_2^K + C_3^K(X - M_1^K)]}{\sum_{K=1}^{M} P(w_K|X)} \quad \text{where} \quad \text{Eq. 11}$$

$$P(w_K|X) \equiv \frac{P_K|C_1^K|^{-\frac{1}{2}}\exp\left\{-\frac{1}{2}(X - M_1^K)^T C_1^{K*}(X - M_1^K)\right\}}{\sum_{l=1}^{R} P_l|C_1^l|^{-\frac{1}{2}}\exp\left\{-\frac{1}{2}(X - M_1^l)^T C_1^{l*}(X - M_1^l)\right\}}$$

$P_K$ is the prior probability of Kth element distribution of mixed distribution modeled from combine probability distributions of the first and second training vectors R is the number of elements in the mixed distribution Expectation vector E of coordinates of feature points obtained in Equation 11 is equal to an expectation of an output with respect to the input vector data X obtained by learning the relationship between training vectors $V_1$ and $V_2$ using the Bayes estimation on the assumption that the distribution of combined vector of two vectors is mixed normal distribution. The Bayes estimation is a statistical estimation method for defining the distribution of population parameters and proper loss function and estimating to minimize the expectation of the loss function. In other words, it is understood that using Equation 11, it is possible to estimate the most likely output value with respect to the input vector data X.

The subsequent processing, S2203 to S2206, is the same as in the first embodiment, and descriptions thereof are omitted.

As described above, according to the fifth embodiment, input sample images are divided into a plurality of distributions, correlation between input sample images and coordinates of feature point of the input images are studied for each distribution, and using the correlation, coordinates of feature points of an input matching-target image are estimated. It is thereby possible to accurately estimate the coordinates of feature points even when fluctuations exist on distributions i.e. characteristics of input matching-target images.

Further, as indicated in Eq.11, it is possible to estimate specific parameters of an input vector in direct calculation by matrix manipulation. In this way, it is possible to perform estimation with greatly less cost than the search by repeat computations using the conventional matching and with greatly high accuracy because the mixed distribution model is used, thus resulting in effectiveness of extremely high degree.

Furthermore, according to the fifth embodiment, it is possible to obtain cross-correlation information for each element distribution simply by matrix manipulation i.e. only by multiplication.

SIXTH EMBODIMENT

The sixth embodiment copes with the case where fluctuations exist on the distributions of input vectors that are input sample images. In contrast to the fifth embodiment where the training vector $V_2$ is obtained from respective coordinates of feature points of a face, as in the second embodiment, the sixth embodiment describes obtaining the training vector $V_2$ from region images around the coordinates of feature points of a face, and automatically generating a template suitable for a matching-target face image from the matching-target face image.

Specifically, combined information of input sample images and region images around coordinates of feature points of a face are divided into a plurality of distributions, correlation between a matching-target image and coordinates of feature points of the matching-target image is studied for each distribution, and using the correlations, coordinates of feature points of the matching-target image are obtained.

Further, the processing of data matching apparatus according to the sixth embodiment is divided broadly into offline processing and online processing, as in the second and fifth embodiments. Herein, differences from the first embodiment are particularly explained with reference to FIGS. 24 to 25.

The processing of S2400 to S2402 and S2404 in the offline processing in the sixth embodiment is the same as that of S10 to S12 and S15 illustrated in FIG. 6 as in the first embodiment, and descriptions thereof are omitted. Further, the processing of S2405 to S2408 is the same as that of S2105 to S2108 in FIG. 21, and descriptions thereof are omitted.

Second training vector calculating section 201 in learning section 103 fetches images of respective peripheral regions of portions of a face to calculate the training vector $V_2$ (S2403).

Figure 24:
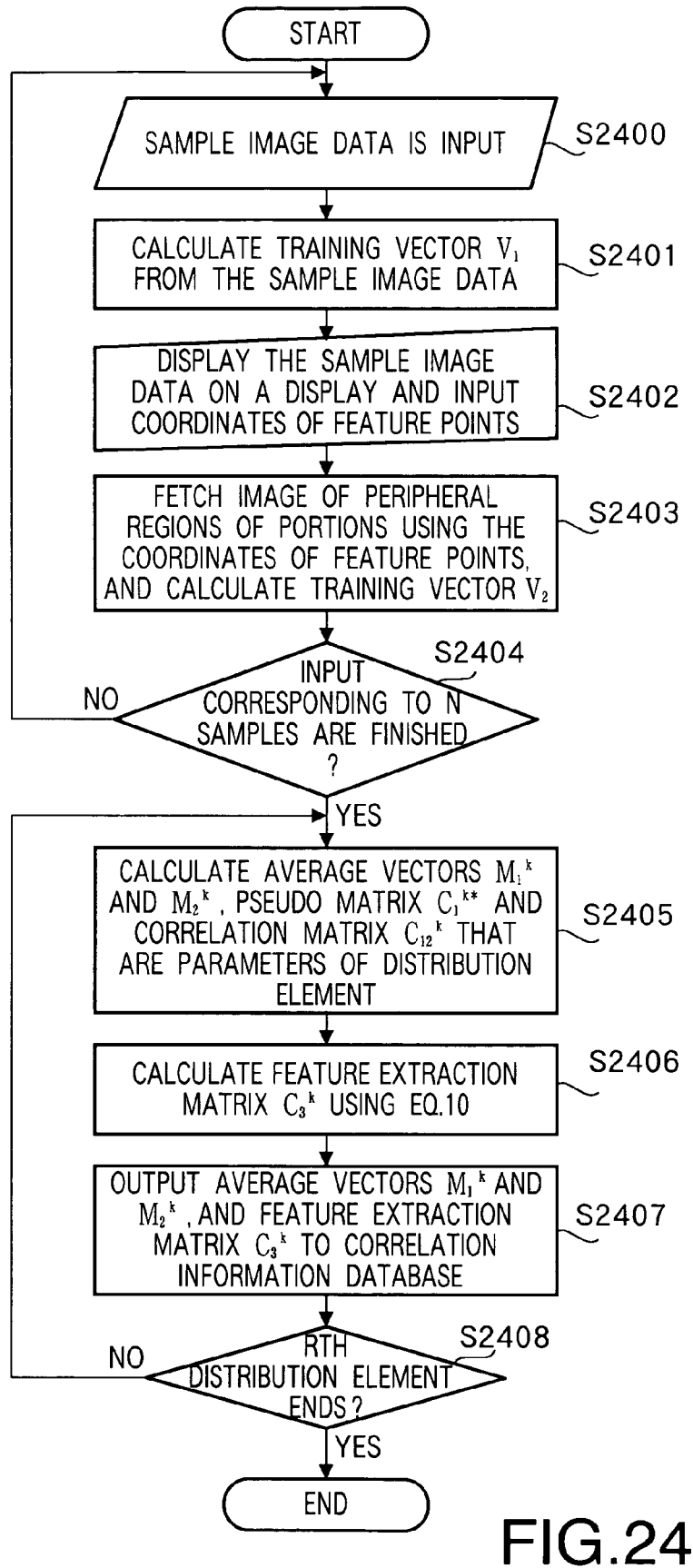
FIG. 24 is an operation flow diagram of offline processing of a data matching apparatus according to a sixth embodiment of the present invention.

Next, after confirming N inputs are finished in S2404, learning section 103 executes the processing of S2405 to S2408 shown in FIG. 24, and stores average vectors $M_1^k$ and $M_2^k$ and feature extraction matrix $C_3^{k*}$ corresponding to Rth distribution in the correlation information database. In addition, feature extraction matrix $C_3^{k*}$ is produced from region images on the peripheries of coordinates of feature points of the face.

Figure 25:
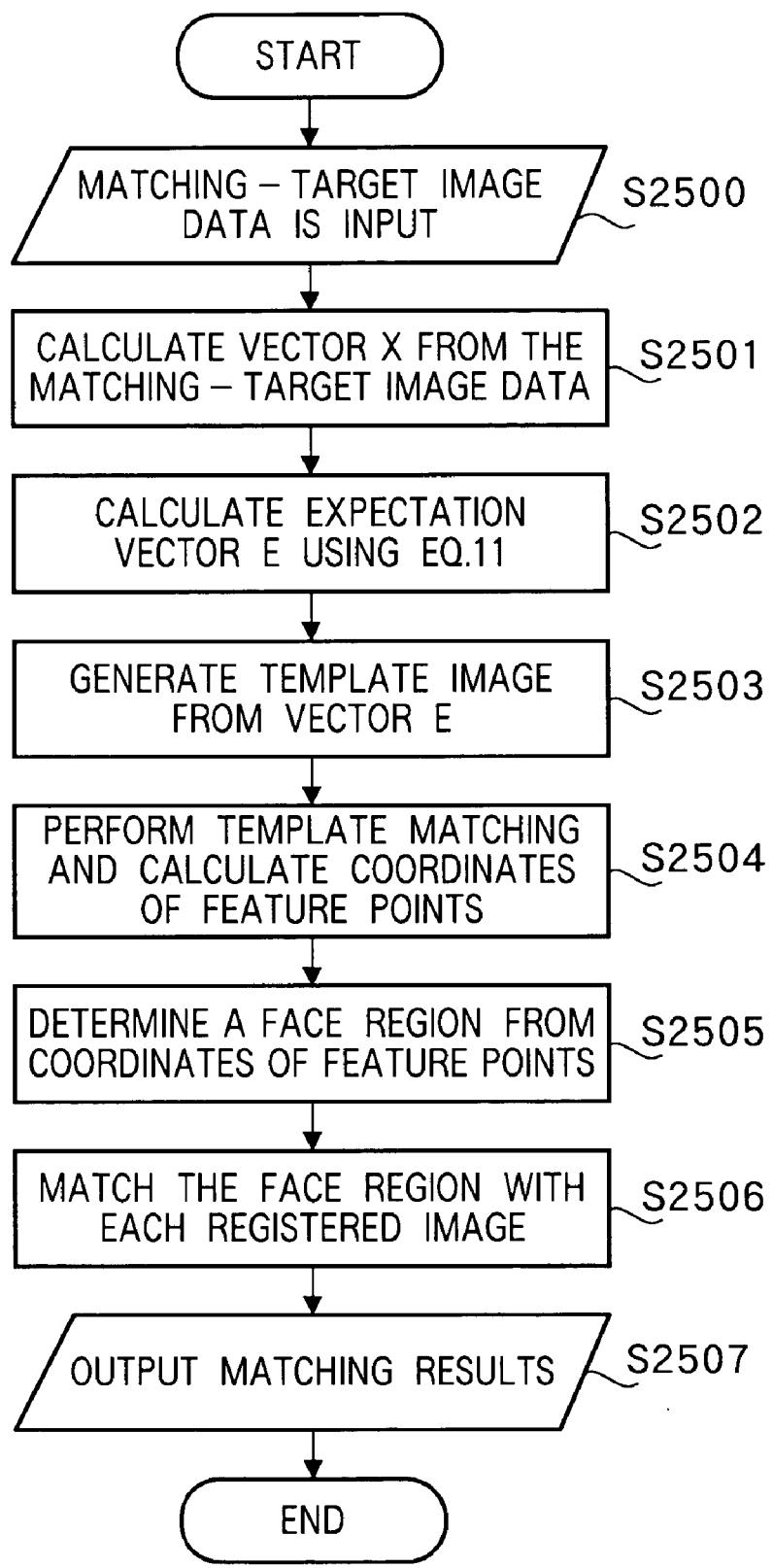
FIG. 25 is an operation flow diagram of online processing of the data matching apparatus according to the sixth embodiment.

The online processing in the sixth embodiment will be described below with reference to an operation flow diagram shown in FIG. 25.

The processing of S2500, S2501 and S2505 to S2507 in the online processing in the sixth embodiment is the same as that of S20, S21 and S24 to S26 in FIG. 9 as in the first embodiment, and descriptions thereof are omitted.

Parameter calculating section 302 calculates the expectation vector E from the vector X calculated in S2501 using Eq.11 (S2502).

Template matching section 303 generates template images that are modeled to element distributions with R distributions (S2503), performs template matching, and calculates coordinates of feature points in the second electronic data (S2504).

Subsequent processing, S2505 to S2507, is the same as in the first embodiment, and descriptions thereof are omitted.

As described above, according to the sixth embodiment, sample images are divided into a plurality of distributions, correlation between the sample images and respective images of portions of the images are studied for each distribution, and using the correlations, respective images of portions of an input matching-target image are estimated. It is thereby possible to accurately estimate each portion even when fluctuations exist on distributions i.e. characteristics of input images for matching. Then, by performing the template matching using the estimated respective images of portions, it is possible to detect coordinates of feature points of a matching-target input image.

SEVENTH EMBODIMENT

The seventh embodiment copes with the case where fluctuations exist on the distributions of input vectors that are input sample images, as in the sixth embodiment. In contrast to the fifth embodiment where the training vector $V_2$ is obtained from respective coordinates of feature points of a face and to the sixth embodiment where the training vector $V_2$ is obtained from region images around coordinates of feature points of a face, the seventh embodiment describes obtaining the training vector $V_2$ from combined vectors of coordinates of feature points of a face and region images around the coordinates of the feature points. Then, coordinates of feature points of a matching-target face image are estimated from thus obtained training vectors $V_2$, and a template suitable for the matching-target face image is automatically generated from the matching-target face image. Using the automatically generated template with peripheral regions of coordinates of feature points, matching is performed.

It is thereby possible to limit a search area of the template, and perform the matching processing using a sheet of template. As a result, it is possible to greatly reduce cost as compared to the case of searching the entire region a matching-target face image using a plurality of templates.

Figure 26:
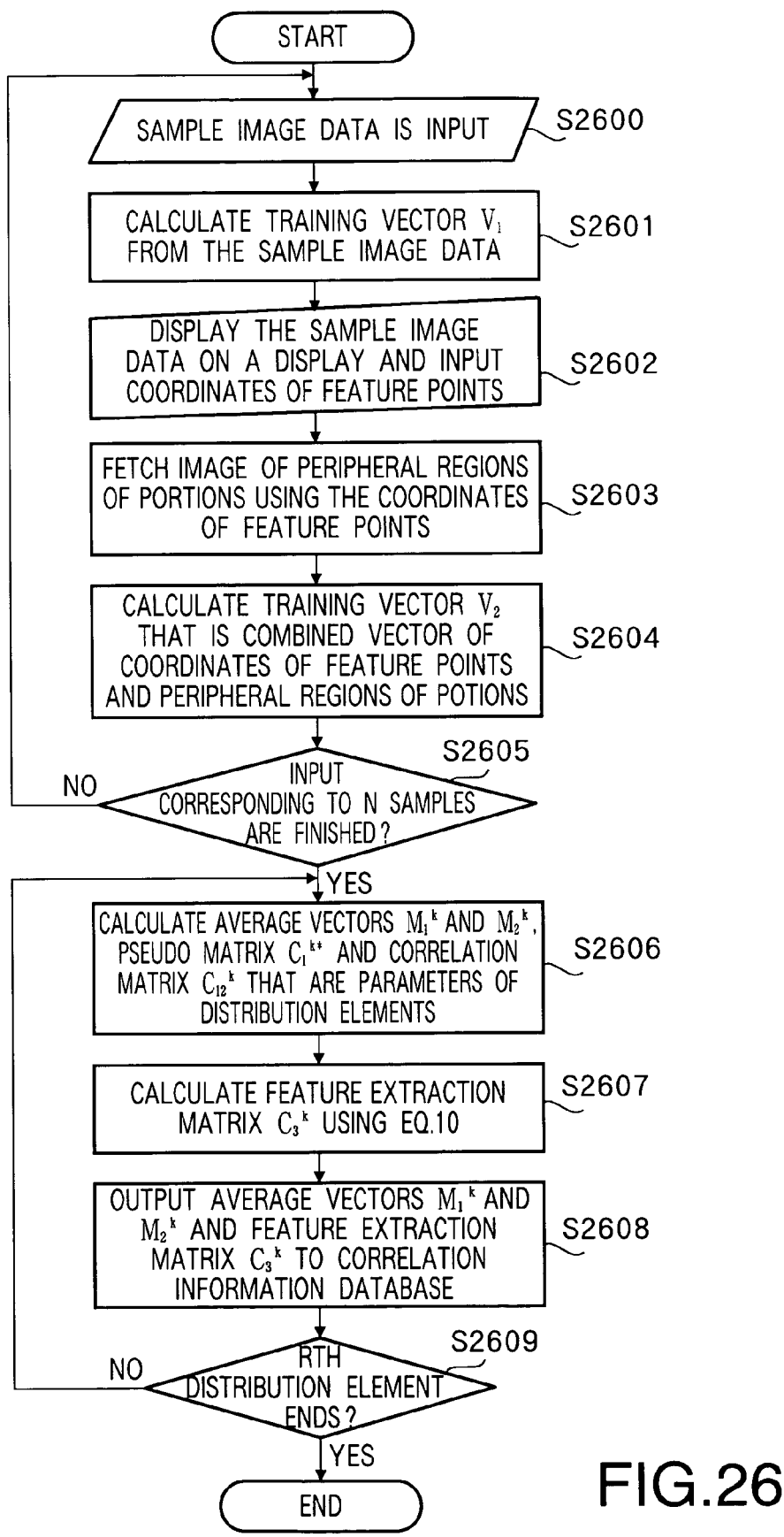
FIG. 26 is an operation flow diagram of offline processing of a data matching apparatus according to a seventh embodiment of the present invention.

As in the third and fifth embodiments, the processing of the data matching apparatus according to the seventh is divided broadly into offline processing and online processing. Herein, particularly, differences from the first are explained with reference to FIGS. 26 and 27.

In the offline processing in the seventh embodiment, processing of S2600 to S2602 and S2605 is the same as that of S10 to S12 and S15 shown in FIG. 6, and descriptions thereof are omitted.

Second training vector calculating section 201 in learning section 103 fetches images of respective peripheral regions of portions in the first electronic data using coordinates of feature points input in S2602 (S2603), and calculates the training vector $V_2$ that is a combined vector of the coordinates of feature points input in S2602 and the images fetched in S2603 (S2604).

Next, after confirming inputs corresponding N samples are finished in S2605, learning section 103 executes processing the same as the processing of S2405 to S2408 shown in FIG. 24, and stores average vectors $M_1^k$ and $M_2^k$ and feature extraction matrixes $C_3^{k*}$ corresponding to R distributions in the correlation information database (S2606 to 2609).

In addition, the feature extraction matrix $C_3^{k*}$ is produced from the combined vector of coordinates of feature points in the first electronic data and region images on the peripheries of coordinates of feature points.

Figure 27:
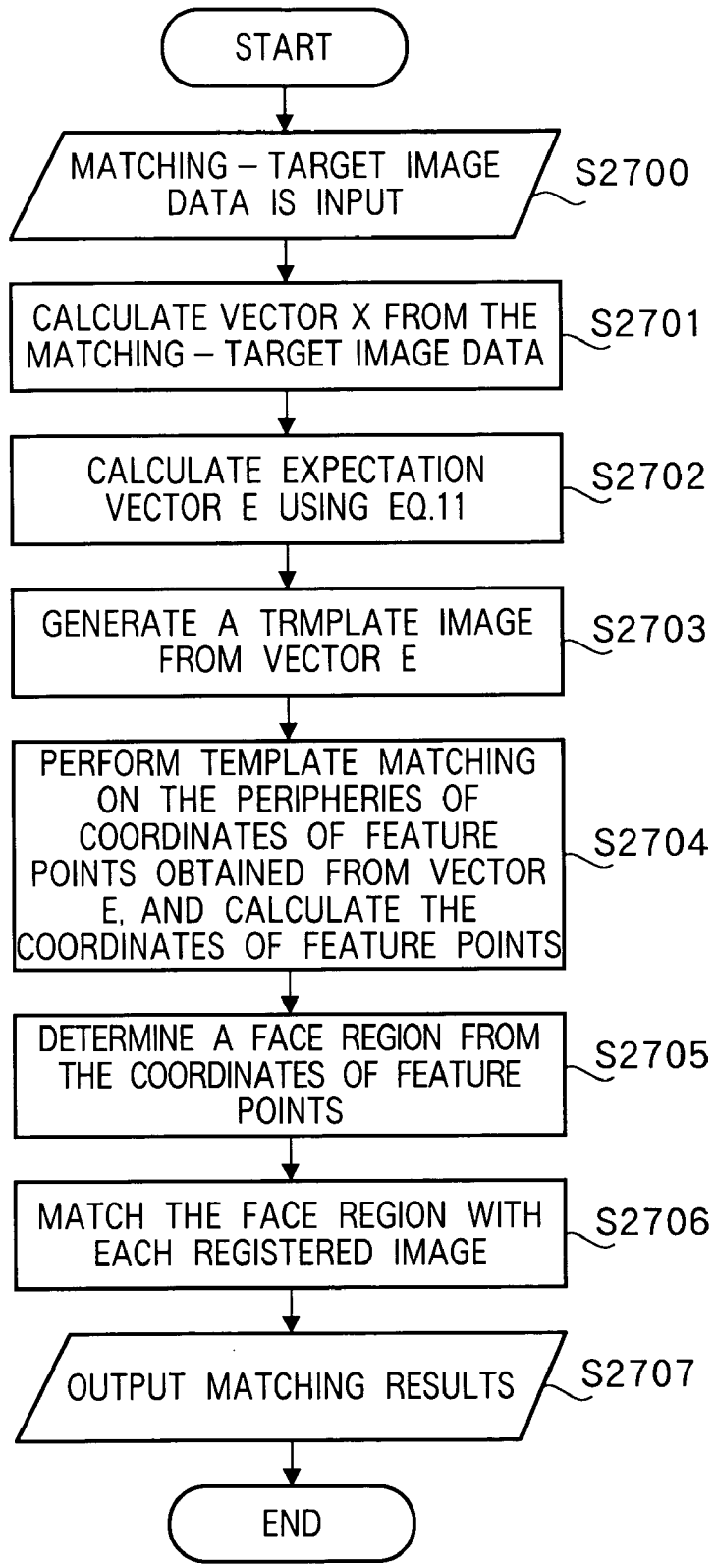
FIG. 27 is an operation flow diagram of online processing of the data matching apparatus according to the seventh embodiment.

The online processing in the seventh embodiment will be described below with reference to an operation flow diagram shown in FIG. 27.

The processing of S2700, S2701 and S2705 to S2707 in the online processing in the seventh embodiment is the same as that of S20, S21 and S24 to S26 in FIG. 9 as in the first embodiment, and descriptions thereof are omitted.

Parameter calculating section 302 calculates the expectation vector E from the vector X calculated in S2701 using Eq.11 (S2702).

Template matching section 303 generates template image that are modeled to element distributions with R distributions (S2703), performs template matching on the peripheries of the coordinates of feature points obtained from the vector E in S2703, and calculates coordinates of feature points in the second electronic data (S2704).

Subsequent processing, S2705 to S2707, is the same as in the first embodiment, and descriptions thereof are omitted.

As described above, according to the seventh embodiment, sample images are divided into a plurality of distributions, correlation between the sample images and images of respective portions of the images are studied for each distribution. Then, using the correlations, it is possible to estimate respective coordinates of feature points in a face of an input matching-target image are estimated. Further, by hierarchical search processing such that the matching is performed on peripheral regions of the estimated coordinates of feature points using the estimated template, it is possible to estimate coordinates of feature points of an matching-target image.

In this way, it is possible to improve the precision in estimating coordinates of feature points, and further it is possible to perform the estimation using a sheet of template while restricting a range for template matching to limited regions. As a result, computation cost can be reduced as compared to the conventional method of searching all areas.

EIGHTH EMBODIMENT

The eighth embodiment of the present invention copes with the case where sample input images are of vehicle, and input matching-target images have various distributions when fluctuations exist on the distributions of input vectors that are the input sample images of vehicles as in the fifth embodiment.

The processing of data matching apparatus according to the eighth embodiment is divided broadly into offline processing and online processing, as in the fourth and fifth embodiments. Herein, differences from the first embodiment are particularly explained with reference to FIG. 28.

Since the offline processing of the eighth embodiment is the same as that in the fifth embodiment, and descriptions thereof are omitted. In addition, average vectors $M_1^k$ and $M_2^k$ and feature extraction matrix $C_3^{k*}$ for each of R distributions are generated from a vehicle image, region image of number plate portion, and region image of front portion.

Figure 28:
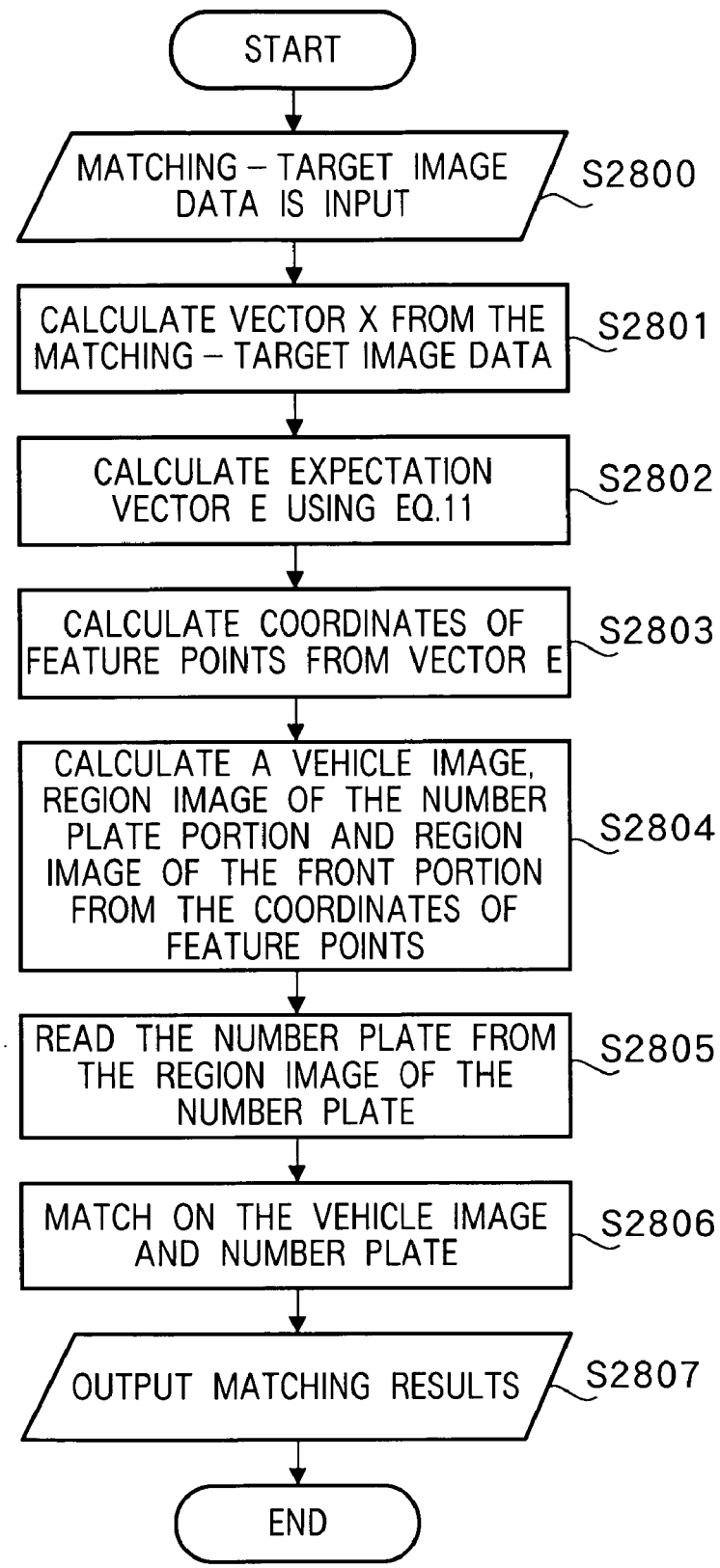
FIG. 28 is an operation flow diagram of online processing of a vehicle image matching apparatus according to an eighth embodiment of the present invention.

The online processing in the eighth embodiment will be described below with reference to an operation flow diagram shown in FIG. 28.

The processing of S2800, S2801 and S2803 to S2807 in the online processing in the eighth embodiment is the same as that of S20, S21 and S23 to S26 in FIG. 9 as in the first embodiment, and descriptions thereof are omitted.

Parameter calculating section 302 calculates the expectation vector E from the vector X calculated in S2801 using Eq.11 (S2802).

Matching section 107 calculates a vehicle image, region image of the number plate portion and region image of the front portion from coordinates of feature points calculated in S2803 (S2804), reads numbers on the number plate (S2805), and performs matching on the vehicle image and number plate (S2806).

As described above, according to the eighth embodiment, sample vehicle images are divided into a plurality of distributions, correlation between the sample vehicle images and images of respective coordinates of feature points of the images are studied for each distribution, and using the correlations, images in the respective coordinates of feature points of a matching-target vehicle image are estimated.

It is thereby possible to accurately estimate respective coordinates of feature points even when a matching-target vehicle has fluctuations on the distribution i.e. characteristics. Then, by performing template matching using the estimated images of respective coordinates of feature points as templates, it is possible to detect coordinates of feature points of the matching-target vehicle image.

In addition, while in the eighth embodiment the data matching apparatus in the fifth embodiment is applied to a vehicle image matching apparatus, it may be possible to apply the data matching apparatus in sixth or seventh embodiment to a vehicle image matching apparatus.

Further, the present invention is not limited to the above-mentioned embodiments.

The present invention is capable of being carried into practice readily using an independent computer system, by reading a program in another computer and storing the program in a storage medium such as a flexible disk to transfer.

The present invention includes in its aspect computer program products that are storage media including instructions for use in programming for computers that implements the present invention. The storage media include, for example, flexible disk, optical disk, CDROM, magnetic disk, ROM, RAM, EPROM, EEPROM, magnetic-optical card, memory card and DVD, but are not limited to the foregoing.

The parameter estimation apparatus of the present invention may be used to match images other than face images and vehicle images.

While in the above-mentioned embodiments the parameter estimation apparatus is applied to image matching, it may be possible to use the parameter estimation apparatus of the present invention as matching apparatuses for matching other than image matching, by inputting data other than images as input data. For example, it may be possible to apply the parameter estimation apparatus to a speech matching apparatus by inputting speech data as input data.

This application is based on the Japanese Patent Applications No.2001-291620 filed on Sep. 25, 2001 and No.2002-129428 filed on Apr. 30, 2002, entire contents of which are expressly incorporated by reference herein.

INDUSTRIAL APPLICABILITY

As described above, according to the present invention, it is possible to accurately obtain coordinates of feature points of an input image with less processing cost.

The invention claimed is:

1. A parameter estimation apparatus comprising:
   an image input that converts optical data into electronic data;
   a parameter input that inputs coordinates of a first feature point from first electronic data input from the image input;
   a learning section that calculates auto-correlation information from a plurality of items of first electronic data, calculates cross-correlation information from the plurality of items of first electronic data and coordinates of a plurality of first feature points, calculates a feature extraction matrix for estimating coordinates of a second feature point of second electronic data input from the image input using the auto-correlation information and the cross-correlation information, and outputs a first average vector calculated from the plurality of items of first electronic data, a second average vector calculated from the coordinates of the plurality of first feature points and the feature extraction matrix;
   a correlation information database that stores the first average vector, the second average vector and the feature extraction matrix from the learning section; and
   a parameter estimator that estimates coordinates of the second feature point, using the second electronic data, the first average vector, the second average vector and the feature extraction matrix.

2. The parameter estimation apparatus according to claim 1, wherein the learning section comprises:
   a first training vector calculator that calculates a first training vector of vector pattern where the first electronic data is arranged in the order of scanning;
   a second training vector calculator that calculates a second training vector of vector pattern where the coordinates of the first feature points are arranged sequentially;
   an average vector calculator that calculates the first average vector by averaging a plurality of first training vectors and calculates the second average vector by averaging a plurality of second training vectors;
   an auto-correlation information calculator that receives the plurality of first training vectors and the first average vector, and calculates a pseudo inverse matrix of a first covariance matrix that is auto-correlation information of the first training vectors;
   a cross-correlation information calculator that receives the plurality of first training vectors, the first average vector, the plurality of second training vectors and the second average vector, and calculates a second covariance matrix that is cross-correlation information of the first training vectors and the second training vectors; and
   a feature extraction matrix calculator that receives the pseudo inverse matrix of the first covariance matrix and the second covariance matrix, and calculates the feature extraction matrix from the pseudo inverse matrix of the first covariance matrix and the second covariance matrix.

3. The parameter estimation apparatus according to claim 1, wherein the parameter estimator comprises:
   a vector calculator that receives the second electronic data, and calculates an input vector of vector pattern where the second electronic data is arranged in the order of scanning;
   a parameter calculator that calculates an expectation vector including the coordinates of the second feature point from the input vector, the first average vector, the second average vector and the feature extraction matrix; and
   a template matcher that calculates the coordinates of the second feature point from the expectation vector.

4. A parameter estimation apparatus comprising:
an image input that converts optical data into electronic data;
a parameter input that inputs an image around coordinates of a first feature point from first electronic data input from the image input;
a learning section that calculates auto-correlation information from a plurality of items of first electronic data, calculates cross-correlation information from the plurality of items of first electronic data and images around coordinates of a plurality of first feature points, calculates a feature extraction matrix for estimating an image around coordinates of a second feature point of second electronic data input from the image input using the auto-correlation information and the cross-correlation information, and outputs a first average vector calculated from the plurality of items of first electronic data, a second average vector calculated from the images around the coordinates of the plurality of first feature points, and the feature extraction matrix;
a correlation information database that stores the first average vector, the second average vector and the feature extraction matrix input from the learning section; and
a parameter estimator that estimates coordinates of the second feature point, using the second electronic data, the first average vector, the second average vector and the feature extraction matrix.

5. The parameter estimation apparatus according to claim 4, wherein the learning section comprises:
a first training vector calculator that calculates a first training vector of vector pattern where the first electronic data is arranged in the order of scanning;
a second training vector calculator that calculates a second training vector of vector pattern where the images around the coordinates of the first feature points are arranged sequentially;
an average vector calculator that calculates the first average vector by averaging a plurality of first training vectors and the second average vector by averaging a plurality of second training vectors;
an auto-correlation information calculator that receives the plurality of first training vectors and the first average vector, and calculates a pseudo inverse matrix of a first covariance matrix that is auto-correlation information of the first training vectors;
a cross-correlation information calculator that receives the plurality of first training vectors, the first average vector, the plurality of second training vectors and the second average vector, and calculates a second covariance matrix that is cross-correlation information of the first training vectors and the second training vectors;
and a feature extraction matrix calculator that receives the pseudo inverse matrix of the first covariance matrix and the second covariance matrix, and calculates the feature extraction matrix from the pseudo inverse matrix of the first covariance matrix and the second covariance matrix.

6. The parameter estimation apparatus according to claim 4, wherein the parameter estimator comprises:
a vector calculator that receives the second electronic data, and calculates an input vector of vector pattern where the second electronic data is arranged in the order of scanning;
a parameter calculator that calculates an expectation vector including the image around the coordinates of the second feature point from the input vector, the first average vector, the second average vector and the feature extraction matrix; and
a template matcher that calculates the image around the coordinates of the second feature point from the expectation vector, searches for a matching region that is an image region of the second electronic data matching the image around the coordinates of the second feature point, and calculates the coordinates of the second feature point from the matching region.

7. A parameter estimation apparatus comprising:
an image input that converts optical data into electronic data;
a parameter input that inputs coordinates of a first feature point and an image around the coordinates of the first feature point from first electronic data input from the image input;
a learning section that calculates auto-correlation information from a plurality of items of first electronic data, calculates cross-correlation information from the plurality of items of first electronic data and a combined vector of coordinates of a plurality of first feature points and images around the coordinates of the plurality of first feature points, calculates a feature extraction matrix for estimating coordinates of a second feature point and an image around the coordinates of the second feature point of second electronic data input from the image input using the auto-correlation information and the cross-correlation information, and outputs a first average vector calculated from the plurality of items of first electronic data, a second average vector calculated from a plurality of combined vectors, and the feature extraction matrix;
a correlation information database that stores the first average vector, the second average vector and the feature extraction matrix input from the learning section; and
a parameter estimator that estimates the coordinates of the second feature point, using the second electronic data, the first average vector, the second average vector and the feature extraction matrix.

8. The parameter estimation apparatus according to claim 7, wherein the learning section comprises:
a first training vector calculator that calculates a first training vector of vector pattern where the first electronic data is arranged in the order of scanning;
a second training vector calculator that calculates a second training vector of vector pattern where combined vectors are arranged sequentially;
an average vector calculator that calculates the first average vector by averaging a plurality of first training vectors and the second average vector by averaging a plurality of second training vectors;
an auto-correlation information calculator that receives the plurality of first training vectors and the first average vector, and calculates a pseudo inverse matrix of a first covariance matrix that is auto-correlation information of the first training vectors;
a cross-correlation information calculator that receives the plurality of first training vectors, the first average vector, the plurality of second training vectors and the second average vector, and calculates a second covariance matrix that is cross-correlation information of the first training vectors and the second training vectors; and a feature extraction matrix calculator that calculates the feature extraction matrix from the pseudo inverse matrix of the first covariance matrix and the second covariance matrix.

9. The parameter estimation apparatus according to claim 7, wherein the parameter estimator comprises:
a vector calculator that receives the second electronic data, and calculates an input vector of vector pattern where the second electronic data is arranged in the order of scanning;
a parameter calculator that calculates an expectation vector including the coordinates of the second feature point and the image around the coordinates of the second feature point from the input vector, the first average vector, the second average vector and the feature extraction matrix;
and a template matcher that estimates the coordinates of the second feature point and the image around the coordinates of the second feature point from the expectation vector, searches for a matching region that is an image region of the second electronic data matching the estimated image around estimated coordinates of the second feature point, and calculates the coordinates of the second feature point from the matching region.

10. A parameter estimation apparatus comprising:
an image input that converts optical data into electronic data;
a parameter input that inputs coordinates of a first feature point from first electronic data input from the image input;
a learning section that divides a set of combined information of the first electronic data and the coordinates of the first feature point into a plurality of distributions, calculates for each distribution auto-correlation information from a plurality of items of first electronic data and cross-correlation information from the plurality of items of first electronic data and coordinates of a plurality of first feature points, calculates for each distribution a feature extraction matrix for estimating coordinates of a second feature point of second electronic data input from the image input using the auto-correlation information and the cross-correlation information, and outputs the first average vector calculated from the plurality of items of first electronic data obtained for each distribution, the second average vector calculated from the coordinates of the plurality of first feature points obtained for each distribution, and the feature extraction matrix obtained for each distribution;
a correlation information database that stores the first average vector, the second average vector and the feature extraction matrix obtained for each distribution and input from the learning section; and
a parameter estimator that estimates coordinates of the second feature point for each distribution, using the second electronic data, the first average vector, the second average vector and the feature extraction matrix.

11. The parameter estimation apparatus according to claim 10, wherein the learning section comprises:
a first training vector calculator that calculates a first training vector of vector pattern where the first electronic data is arranged in the order of scanning;
a second training vector calculator that calculates a second training vector of vector pattern where the coordinates of first feature points are arranged sequentially;
a distribution element calculator that generates a plurality of combined vectors from the plurality of first training vectors and the plurality of second training vectors, and using probability distributions of a set of the combined vectors, divides the first training vectors and the second training vectors into a plurality of distributions;
an average vector calculator that calculates for each distribution the first average vector by averaging a plurality of first training vectors and the second average vector by averaging a plurality of second training vectors;
an auto-correlation information calculator that receives the plurality of first training vectors and the first average vector for each distribution, and calculates for each distribution a pseudo inverse matrix of a first covariance matrix that is auto-correlation information of the first training vectors;
a cross-correlation information calculator that receives the plurality of first training vectors, the first average vector, the plurality of second training vectors and the second average vector for each distribution, and calculates for each distribution a second covariance matrix that is cross-correlation information of the first training vectors and the second training vectors; and
a feature extraction matrix calculator that receives the pseudo inverse matrix of the first covariance matrix and the second covariance matrix for each distribution, and calculates the feature extraction matrix from the pseudo inverse matrix of the first covariance matrix and the second covariance matrix.

12. The parameter estimation apparatus according to claim 10, wherein the parameter estimator comprises:
a vector calculator that receives the second electronic data, and calculates an input vector of vector pattern where the second electronic data is arranged in the order of scanning;
a parameter calculator that calculates an expectation vector including the coordinates of the second feature point from the input vector, the first average vector classified for each distribution, the second average vector classified for each distribution and the feature extraction matrix classified for each distribution; and
a template matcher that calculates the coordinates of the second feature point from the expectation vector.

13. A parameter estimation apparatus comprising:
an image input that converts optical data into electronic data;
a parameter input that inputs an image around coordinates of a first feature point from first electronic data input from the image input;
a learning section that divides a set of combined information of the first electronic data and the image around the coordinates of the first feature point into a plurality of distributions, calculates for each distribution auto-correlation information from a plurality of items of first electronic data and cross-correlation information from the plurality of items of first electronic data and images around coordinates of a plurality of first feature points, calculates for each distribution a feature extraction matrix for estimating an image around coordinates of a second feature point of second electronic data input from the image input using the auto-correlation information and the cross-correlation information, and outputs the first average vector calculated from the plurality of items of first electronic data obtained for each distribution, the second average vector calculated from the images around the coordinates of the plurality of first feature points obtained for each distribution, and the feature extraction matrix obtained for each distribution;

a correlation information database that stores the first average vector, the second average vector and the feature extraction matrix obtained for each distribution and input from the learning section; and a parameter section that estimates coordinates of the second feature point for each distribution, using the second electronic data, the first average vector, the second average vector and the feature extraction matrix.

14. The parameter estimation apparatus according to claim 13, wherein the learning section comprises:

a first training vector calculator that calculates a first training vector of vector pattern where the first electronic data is arranged in the order of scanning;

a second training vector calculator that calculates a second training vector of vector pattern where the coordinates of first feature points are arranged sequentially;

a distribution element calculator that generates a plurality of combined vectors of the plurality of first training vectors and the plurality of second training vectors, and using probability distributions of a set of the combined vectors, divides the first training vectors and the second training vectors into a plurality of distributions;

an average vector calculator that calculates for each distribution the first average vector by averaging a plurality of first training vectors and the second average vector by averaging a plurality of second training vectors;

an auto-correlation information calculator that receives the plurality of first training vectors and the first average vector for each distribution, and calculates for each distribution a pseudo inverse matrix of a first covariance matrix that is auto-correlation information of the first training vectors;

a cross-correlation information calculator that receives the plurality of first training vectors, the first average vector, the plurality of second training vectors and the second average vector for each distribution, and calculates for each distribution a second covariance matrix that is cross-correlation information of the first training vectors and the second training vectors; and a feature extraction matrix calculator that receives the pseudo inverse matrix of the first covariance matrix and the second covariance matrix for each distribution, and calculates the feature extraction matrix from the pseudo inverse matrix of the first covariance matrix and the second covariance matrix.

15. The parameter estimation apparatus according to claim 13, wherein the parameter estimator comprises:

a vector calculator that receives as its input the second electronic data, and calculates an input vector of vector pattern where the second electronic data is arranged in the order of scanning;

a parameter calculator that calculates an expectation vector including the image around the coordinates of the second feature point from the input vector, the first average vector classified for each distribution, the second average vector classified for each distribution and the feature extraction matrix classified for each distribution; and a template matcher that calculates the image around the coordinates of the second feature point from the expectation vector, searches for a matching region that is an image region of the second electronic data matching the image around the coordinates of the second feature point, and calculates the coordinates of the second feature point from the matching region.

16. A parameter estimation apparatus comprising:

an image input that converts optical data into electronic data;

a parameter input that inputs coordinates of a first feature point and an image around the coordinates of the first feature point from first electronic data input from the image input;

a learning section that divides a set of combined information of the first electronic data, the coordinates of the first feature point and the image around the coordinates of the first feature point into a plurality of distributions, calculates for each distribution auto-correlation information from a plurality of items of first electronic data and cross-correlation information from the plurality of items of first electronic data, coordinates of a plurality of first feature points and images around the coordinates of the plurality of first feature points, calculates for each distribution a feature extraction matrix for estimating coordinates of a second feature point and an image around the coordinates of the second feature point of second electronic data input from the image input using the auto-correlation information and the cross-correlation information, and outputs a first average vector calculated from the plurality of items of first electronic data obtained for each distribution, a second average vector calculated from the coordinates of the first feature points and the images around the coordinates of the first feature points obtained for each distribution, and the feature extraction matrix obtained for each distribution;

a correlation information database that stores the first average vector, the second average vector and the feature extraction matrix obtained for each distribution and input from the learning section; and a parameter estimator that estimates the coordinates of the second feature point for each distribution, using the second electronic data, the first average vector, the second average vector and the feature extraction matrix.

17. The parameter estimation apparatus according to claim 16, wherein the learning section comprises:

a first training vector calculator that calculates a first training vector of vector pattern where the first electronic data is arranged in the order of scanning;

a second training vector calculator that calculates a second training vector of vector pattern where the coordinates of the first feature points and the images around the coordinates of the first feature points are arranged sequentially;

a distribution element calculator that generates a plurality of combined vectors from the plurality of first training vectors and the plurality of second training vectors, and using probability distributions of a set of the combined vectors, divides the first training vectors and the second training vectors into a plurality of distributions;

an average vector calculator that calculates for each distribution the first average vector by averaging a plurality of first training vectors and the second average vector by averaging a plurality of second training vectors; an auto-correlation information calculator that receives the plurality of first training vectors and the first average vector for each distribution, and calculates for each distribution a pseudo inverse matrix of a first covariance matrix that is auto-correlation information of the first training vectors;

a cross-correlation information calculator that receives the plurality of first training vectors, the first average vector, the plurality of second training vectors and the second average vector for each distribution, and calculates for each distribution a second covariance matrix that is cross-correlation information of the first training vectors and the second training vectors; and a feature extraction matrix calculator that receives the pseudo inverse matrix of the first covariance matrix and the second covariance matrix for each distribution, and calculates the feature extraction matrix from the pseudo inverse matrix of the first covariance matrix and the second covariance matrix.

18. The parameter estimation apparatus according to claim 16, wherein the parameter estimator comprises:

a vector calculator that receives as its input the second electronic data, and calculates an input vector of vector pattern where the second electronic data is arranged in the order of scanning;

a parameter calculator that calculates an expectation vector including the coordinates of the second feature point and an image around the coordinates of the second feature point from the input vector, the first average vector classified for each distribution, the second average vector classified for each distribution and the feature extraction matrix classified for each distribution; and a template matcher that calculates the coordinates of the second feature point and the image around the coordinates of the second feature point from the expectation vector, searches for a matching region that is an image region of the second electronic data matching the image around the coordinates of the second feature point, and calculates the coordinates of the second feature point from the matching region.

19. A data matching apparatus comprising:

an image input that converts optical data into electronic data;

a parameter input that inputs coordinates of a first feature point from first electronic data input from the image input;

a learning section that calculates auto-correlation information from a plurality of items of first electronic data, calculates cross-correlation information from the plurality of items of first electronic data and coordinates of a plurality of first feature points, calculates a feature extraction matrix for estimating coordinates of a second feature point of second electronic data input from the image input using the auto-correlation information and the cross-correlation information, and outputs a first average vector calculated from the plurality of items of first electronic data, a second average vector calculated from the coordinates of the plurality of first feature points, and the feature extraction matrix;

a correlation information database that stores the first average vector, the second average vector and the feature extraction matrix input from the learning section;

a parameter estimator that estimates coordinates of the second feature point, using the second electronic data, the first average vector, the second average vector and the feature extraction matrix;

an image data base that stores the first electronic data; and a matching calculator that calculates a matching region that is an image for use in matching from the second electronic data and the coordinates of the second feature point, and matches the matching region with the first electronic data stored in the image database to obtain matching.

20. A data matching apparatus comprising:

an image input that converts optical data into electronic data;

a parameter input that inputs an image around coordinates of a first feature point from first electronic data input from the image input;

a learning section that calculates auto-correlation information from a plurality of items of first electronic data, calculates cross-correlation information from the plurality of items of first electronic data and images around coordinates of a plurality of first feature points, calculates a feature extraction matrix for estimating an image around coordinates of a second feature point of second electronic data input from the image input using the auto-correlation information and the cross-correlation information, and outputs a first average vector calculated from the plurality of items of first electronic data, a second average vector calculated from the images around the coordinates of the plurality of first feature points, and the feature extraction matrix;

a correlation information database that stores the first average vector, the second average vector and the feature extraction matrix input from the learning section;

a parameter estimator that estimates coordinates of the second feature point, using the second electronic data, the first average vector, the second average vector and the feature extraction matrix;

an image database that stores the first electronic data; and a matching calculator that calculates a matching region that is an image for use in matching from the second electronic data and the coordinates of the second feature point, and matches the matching region with the first electronic data stored in the image database to obtain matching.

21. A data matching apparatus comprising:

an image input that converts optical data into electronic data;

a parameter input that inputs coordinates of a first feature point and an image around the coordinates of the first feature point from first electronic data input from the image input;

a learning section that calculates auto-correlation information from a plurality of items of first electronic data, calculates cross-correlation information from the plurality of items of first electronic data and a combined vector of coordinates of a plurality of first feature points and images around the coordinates of the plurality of first feature points, calculates a feature extraction matrix for estimating coordinates of a second feature point and an image around the coordinates of the second feature point of second electronic data input from the image input using the auto-correlation information and the cross-correlation information, and outputs a first average vector calculated from the plurality of items of first electronic data, a second average vector calculated from a plurality of combined vectors, and the feature extraction matrix;

a correlation information database that stores the first average vector, the second average vector and the feature extraction matrix input from the learning section;

a parameter estimator that estimates the coordinates of the second feature point, using the second electronic data, the first average vector, the second average vector and the feature extraction matrix;

an image database that stores the first electronic data; and a matching calculator that calculates a matching region that is an image for use in matching from the second electronic data and the coordinates of the second feature point, and matches the matching region with the first electronic data stored in the image database to obtain matching.

22. A data matching apparatus comprising:

an image input that converts optical data into electronic data;

a parameter input that inputs coordinates of a first feature point from first electronic data input from the image input;

a learning section that divides a set of combined information of the first electronic data and the coordinates of the first feature point into a plurality of distributions, calculates for each distribution auto-correlation information from a plurality of items of first electronic data and cross-correlation information from the plurality of items of first electronic data and coordinates of a plurality of first feature points, calculates for each distribution a feature extraction matrix for estimating coordinates of a second feature point of second electronic data input from the image input using the auto-correlation information and the cross-correlation information, and outputs the first average vector calculated from the plurality of items of first electronic data obtained for each distribution, the second average vector calculated from the coordinates of the plurality of first feature points obtained for each distribution, and the feature extraction matrix obtained for each distribution;

a correlation information database that stores the first average vector, the second average vector and the feature extraction matrix obtained for each distribution and input from the learning section;

a parameter estimator that estimates the coordinates of the second feature point for each distribution, using the second electronic data, the first average vector, the second average vector and the feature extraction matrix;

an image data base that stores the first electronic data; and a matching calculator that calculates a matching region that is an image for use in matching from the second electronic data and the coordinates of the second feature point, and matches the matching region with the first electronic data stored in the image database to obtain matching.

23. A data matching method, comprising:

converting optical data into electronic data;

inputting coordinates of a first feature point from first electronic data of the converted electronic data;

calculating auto-correlation information from a plurality of items of first electronic data, calculating cross-correlation information from the plurality of items of first electronic data and coordinates of a plurality of first feature points, calculating a feature extraction matrix for estimating coordinates of a second feature point of second electronic data of the converted electronic data using the auto-correlation information and the cross-correlation information, and outputting a first average vector calculated from the plurality of items of first electronic data, a second average vector calculated from the coordinates of the plurality of first feature points, and the feature extraction matrix;

storing the first average vector, the second average vector and the feature extraction matrix in a correlation information database, and estimating coordinates of the second feature point using the second electronic data, first average vector, the second average vector and the feature extraction matrix; and storing the first electronic data in an image database, calculating a matching region that is an image for use in matching from the second electronic data and the coordinates of the second feature point, and collating the matching region with the first electronic data stored in the image database to obtain matching.

24. A data matching method, comprising:

converting optical data into electronic data;

inputting an image around coordinates of a first feature point from first electronic data of the converted electronic data;

calculating auto-correlation information from a plurality of items of first electronic data, calculating cross-correlation information from the plurality of items of first electronic data and images around coordinates of a plurality of first feature points, calculating a feature extraction matrix for estimating an image around coordinates of a second feature point of second electronic data of the converted electronic data using the auto-correlation information and the cross-correlation information, and outputting a first average vector calculated from the plurality of items of first electronic data, a second average vector calculated from the images around the coordinates of the plurality of first feature points, and the feature extraction matrix;

storing the first average vector, the second average vector and the feature extraction matrix in a correlation information database, and estimating the coordinates of the second feature point using the second electronic data, the first average vector, the second average vector and the feature extraction matrix, the second electronic data, the first average vector, the second average vector and the feature extraction matrix; and storing the first electronic data in an image database, calculating a matching region that is an image for use in matching from the second electronic data and the coordinates of the second feature point, and collating the matching region with the first electronic data stored in the image database to obtain matching.

25. A data matching method, comprising:

converting optical data into electronic data;

inputting coordinates of a first feature point and an image around the coordinates of the first feature point from first electronic data of the converted electronic data;

calculating auto-correlation information from a plurality of items of first electronic data, calculating cross-correlation information from the plurality of items of first electronic data and a combined vector of coordinates of a plurality of first feature points and images around the coordinates of the plurality of first feature points, calculating a feature extraction matrix for estimating coordinates of a second feature point and an image around the coordinates of the second feature point of second electronic data of the converted electronic data using the auto-correlation information and the cross-correlation information, and outputting a first average vector calculated from the plurality of items of first electronic data, a second average vector calculated from a plurality of combined vectors, and the feature extraction matrix;

storing the first average vector, the second average vector and the feature extraction matrix in a correlation information database, and estimating coordinates of the second feature point, using the second electronic data, the first average vector, the second average vector and the feature extraction matrix; and storing the first electronic data in an image database, calculating a matching region that is an image for use in matching the second electronic data and the coordinates of the second feature point, and collating the matching region with the first electronic data stored in the image database to obtain matching.

26. A data matching method, comprising:

converting optical data into electronic data;

inputting coordinates of a first feature point from first electronic data of the converted electronic data;

dividing a set of combined information of the first electronic data and the coordinates of the first feature point into a plurality of distributions, calculating for each distribution auto-correlation information from a plurality of items of first electronic data and cross-correlation information from the plurality of items of first electronic data and coordinates of a plurality of first feature points, calculating for each distribution a feature extraction matrix for estimating coordinates of a second feature point of second electronic data of the converted electronic data using the auto-correlation information and the cross-correlation information, and outputting the first average vector calculated from the plurality of items of first electronic data obtained for each distribution, the second average vector calculated from the coordinates of the plurality of first feature points obtained for each distribution, and the feature extraction matrix obtained for each distribution;

storing the first average vector, the second average vector and the feature extraction matrix obtained for each distribution, and estimating coordinates of the second feature point for each distribution, using the second electronic data, the first average vector, the second average vector and the feature extraction matrix; and storing the first electronic data in an image database, calculating a matching region that is an image for use in matching from the second electronic data and the coordinates of the second feature point, and collating the matching region with the first electronic data stored in the image database to obtain matching.

27. A computer readable medium for storing a computer program for instructing a computer to execute data matching processing, the computer readable medium comprising:

an inputting code segment for inputting coordinates of a first feature point from first electronic data of electronic data converted from optical data;

a calculating code segment for calculating auto-correlation information from a plurality of items of first electronic data, calculating cross-correlation information from the plurality of items of first electronic data and coordinates of a plurality of first feature points, calculating a feature extraction matrix for estimating coordinates of a second feature point of input second electronic data input from the auto-correlation information and the cross-correlation information, and outputting a first average vector calculated from the plurality of items of first electronic data, a second average vector calculated from the coordinates of the plurality of first feature points, and the feature extraction matrix;

an estimating code segment for storing the first average vector, the second average vector and the feature extraction matrix in a correlation information database, and estimating coordinates of the second feature point using the second electronic data, the first average vector, the second average vector and the feature extraction matrix; and a storing code segment for storing the first electronic data in an image database, calculating a matching region that is an image for use in matching from the second electronic data and the coordinates of the second feature point, and collating the matching region with the first electronic data stored in the image database to obtain matching.

28. A computer readable medium for storing a computer program for instructing a computer to execute data matching processing, the computer readable medium comprising:

an inputting code segment for inputting an image around coordinates of a first feature point from first electronic data of electronic data converted from optical data;

a calculating code segment for calculating auto-correlation information from a plurality of items of first electronic data, calculating cross-correlation information from the plurality of items of first electronic data and images around coordinates of a plurality of first feature points, calculating a feature extraction matrix for estimating an image around coordinates of a second feature point of second electronic data of the converted electronic data using the auto-correlation information and the cross-correlation information, and outputting a first average vector calculated from the plurality of items of first electronic data, a second average vector calculated from the images around the coordinates of the plurality of first feature points, and the feature extraction matrix;

an estimating code segment for storing the first average vector, the second average vector and the feature extraction matrix in a correlation information database, and estimating coordinates of the second feature point using the second electronic data, the first average vector, the second average vector and the feature extraction matrix; and a storing code segment for storing the first electronic data in an image database, calculating a matching region that is an image for use in matching from the second electronic data and the coordinates of the second feature point, and collating the matching region with the first electronic data stored in the image database to obtain matching.

29. A computer readable medium for storing a computer program for instructing a computer to execute data matching processing, the computer readable medium comprising:

an inputting code segment for inputting coordinates of a first feature point and an image around the coordinates of the first feature point from first electronic data of electronic data converted from optical data;

a calculating code segment for calculating auto-correlation information from a plurality of items of first electronic data, calculating cross-correlation information from the plurality of items of first electronic data and a combined vector of coordinates of a plurality of first feature points and images around the coordinates of the plurality of first feature points, calculating a feature extraction matrix for estimating coordinates of a second feature point and an image around the coordinates of the second feature point of second electronic data of the converted electronic data using the auto-correlation information and the cross-correlation information, and outputting a first average vector calculated from the plurality of items of first electronic data, a second average vector calculated from a plurality of combined vectors, and the feature extraction matrix;

an estimating code segment for storing the first average vector, the second average vector and the feature extraction matrix in a correlation information database, and estimating coordinates of the second feature point using the second electronic data, the first average vector, the second average vector and the feature extraction matrix; and a storing code segment for storing the first electronic data in an image database, calculating a matching region that is an image for use in matching from the second electronic data and the coordinates of the second feature point, and collating the matching region with the first electronic data stored in the image database to obtain matching.

30. A computer readable medium for storing a computer program for instructing a computer to execute data matching processing, the computer readable medium comprising:

an inputting code segment for inputting coordinates of a first feature point from first electronic data of electronic data converted from optical data;

an calculating code segment for dividing a set of combined information of the first electronic data and the coordinates of the first feature point into a plurality of distributions, calculating for each distribution auto-correlation information from a plurality of items of first electronic data and cross-correlation information from the plurality of items of first electronic data and coordinates of a plurality of first feature points, calculating for each distribution a feature extraction matrix for estimating coordinates of a second feature point of second electronic data of the converted electronic data using the auto-correlation information and the cross-correlation information, and outputting the first average vector calculated from the plurality of items of first electronic data obtained for each distribution, the second average vector calculated from the coordinates of the plurality of first feature points obtained for each distribution, and the feature extraction matrix obtained for each distribution;

an estimating code segment for storing the first average vector, the second average vector and the feature extraction matrix obtained for each distribution in a correlation information database, and estimating coordinates of the second feature point for each distribution using the second electronic data, the first average vector, the second average vector and the feature extraction matrix; and a storing code segment for storing the first electronic data in an image database, calculating a matching region that is an image for use in matching from the second electronic data and the coordinates of the second feature point, and collating the matching region with the first electronic data stored in the image database to obtain matching.

* * * * *

UNITED STATES PATENT AND TRADEMARK OFFICE
CERTIFICATE OF CORRECTION

PATENT NO. : 7,224,823 B2 Page 1 of 1
APPLICATION NO. : 10/415884
DATED : May 29, 2007
INVENTOR(S) : K. Hayata et al.

It is certified that error appears in the above-identified patent and that said Letters Patent is hereby corrected as shown below:

At column 35, line 28 (claim 30, line 7) "an calculating" should read --a calculating--.

On the title page, Item (56), Other Publications, after "English Language Abstract of JP Appin. No. 2001-014465.", add -- English Language Abstract of JP 2001-118068.--.

Signed and Sealed this

Twentieth Day of November, 2007

JON W. DUDAS
*Director of the United States Patent and Trademark Office*